(12) United States Patent
Yang et al.

(10) Patent No.: US 9,148,272 B2
(45) Date of Patent: Sep. 29, 2015

(54) METHOD AND APPARATUS FOR TRANSCEIVING SIGNALS

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 14/240,294

(22) PCT Filed: Sep. 26, 2012

(86) PCT No.: PCT/KR2012/007769
§ 371 (c)(1),
(2) Date: Feb. 21, 2014

(87) PCT Pub. No.: WO2013/048120
PCT Pub. Date: Apr. 4, 2013

(65) Prior Publication Data
US 2014/0204813 A1      Jul. 24, 2014

Related U.S. Application Data

(60) Provisional application No. 61/538,954, filed on Sep. 26, 2011.

(51) Int. Cl.
*H04L 5/00* (2006.01)
*H04L 5/14* (2006.01)
(Continued)

(52) U.S. Cl.
CPC .............. *H04L 5/0092* (2013.01); *H04L 5/001* (2013.01); *H04L 5/0055* (2013.01); *H04L 5/14* (2013.01); *H04B 7/2656* (2013.01); *H04L 1/1861* (2013.01)

(58) Field of Classification Search
CPC .............................. H04L 5/001; H04L 5/0055
USPC ......................................................... 370/280
See application file for complete search history.

(56) References Cited

U.S. PATENT DOCUMENTS 8,824,405 B2 * 9/2014 Moon et al. .................. 370/329
2010/0080139 A1   4/2010 Palanki et al.
(Continued)

FOREIGN PATENT DOCUMENTS

KR    10-2011-0069834 A    6/2011
KR    10-2011-0073689 A    6/2011
(Continued)

*Primary Examiner* — Melvin Marcelo
*Assistant Examiner* — Peter Solinsky
(74) *Attorney, Agent, or Firm* — Birch, Stewart, Kolasch & Birch, LLP

(57) ABSTRACT

The present invention relates to a wireless communication system. More particularly, the present invention relates to a method and to an apparatus for the method, wherein the method is configured such that a base station, in which cross-carrier scheduling through a first component carrier (CC) is set, transmits a downlink signal in a TDD wireless communication system in which the first CC and a second CC are aggregated, wherein the method comprises a step of transmitting a control channel signal during a specific subframe timing during which the second CC is set as a downlink. The transmitting step involves transmitting the control channel signal through a control channel region of the first CC when the first CC is set as a downlink in the specific subframe timing, and transmitting the control channel signal through a control channel region of the second CC when the first CC is set as an uplink during the specific subframe timing.

18 Claims, 18 Drawing Sheets

(51) Int. Cl.
  *H04B 7/26* (2006.01)
  *H04L 1/18* (2006.01)

(56) References Cited

U.S. PATENT DOCUMENTS

| | | | |
|---|---|---|---|
| 2010/0080166 A1* | 4/2010 | Palanki et al. | 370/315 |
| 2010/0097978 A1* | 4/2010 | Palanki et al. | 370/315 |
| 2011/0170499 A1* | 7/2011 | Nayeb Nazar et al. | 370/329 |
| 2012/0113941 A1* | 5/2012 | Chung et al. | 370/329 |
| 2012/0257554 A1* | 10/2012 | Kim et al. | 370/280 |
| 2012/0263127 A1 | 10/2012 | Moon et al. | |
| 2013/0294423 A1* | 11/2013 | Wang et al. | 370/336 |
| 2014/0016519 A1* | 1/2014 | Kim et al. | 370/280 |
| 2014/0029490 A1* | 1/2014 | Kim et al. | 370/280 |
| 2014/0050130 A1* | 2/2014 | Kim et al. | 370/280 |
| 2014/0204854 A1* | 7/2014 | Freda et al. | 370/329 |
| 2014/0376421 A1* | 12/2014 | Yang et al. | 370/280 |
| 2015/0103705 A1* | 4/2015 | Yang et al. | 370/280 |

FOREIGN PATENT DOCUMENTS

| | | |
|---|---|---|
| WO | WO 2011/005032 A2 | 1/2011 |
| WO | WO 2011/083983 A2 | 7/2011 |
| WO | WO 2013155705 A1 * | 10/2013 |

* cited by examiner

| SF index | 0 | 1 | 2 | 3 | 4 | 5 | 6 | 7 | 8 | 9 |
|---|---|---|---|---|---|---|---|---|---|---|
| MCC (Cfg 3) | D | S | U | U | U | D | D | D | D | D |
| SCC (Cfg 4) | D | S | U | U | D | D | D | D | D | D |

METHOD AND APPARATUS FOR TRANSCEIVING SIGNALS

CROSS REFERENCE TO RELATED APPLICATIONS

This application is the National Phase of PCT/KR2012/007769 filed on Sep. 26, 2012, which claims priority under 35 U.S.C. 119(e) to U.S. Provisional Application No. 61/538,954 filed on Sep. 26, 2011, all of which are hereby expressly incorporated by reference into the present application.

TECHNICAL FIELD

The present invention relates to a wireless communication system and, more particularly, to a method of transmitting and receiving a signal in a system supporting Time Division Duplex (TDD) and an apparatus for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmit power, etc.) thereamong. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention is to provide a method of efficiently transmitting and receiving a signal in a wireless communication system supporting TDD and an apparatus for the same.

Another object of the present invention is to provide a method of efficiently transmitting and receiving a signal in case that a plurality of component carriers having different uplink-downlink configurations are carrier aggregated in a system supporting TDD and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, there is provided a downlink signal transmitting method performed by a base station for which cross-carrier scheduling via a first Component Carrier (CC) is configured in a Time Division Duplexing (TDD) wireless communication system in which the first CC and a second CC are aggregated, the method including transmitting a control channel signal in specific subframe timing in which the second CC is configured as downlink, wherein the transmitting of the control channel signal includes transmitting the control channel signal via a control channel region of the first CC when the first CC is configured as downlink in the specific subframe timing, and wherein the transmitting of the control channel signal via a control channel region of the second CC when the first CC is configured as uplink in the specific subframe timing.

In another aspect of the present invention, there is provided a base station for which cross-carrier scheduling via a first component carrier (CC) is configured in a TDD wireless communication system in which the first CC and a second CC are aggregated, the base station including a Radio Frequency (RF) unit and a processor, wherein the processor is configured to transmit a control channel signal in specific subframe timing in which the second CC is configured as downlink, and wherein the transmitting of the control channel signal includes transmitting the control channel signal via a control channel region of the first CC when the first CC is configured as downlink in the specific subframe timing and transmitting the control channel signal via a control channel region of the second CC when the first CC is configured as uplink in the specific subframe timing.

The control channel signal may be an uplink grant Physical Downlink Control Channel (PDCCH) signal or a downlink grant PDCCH signal for the second CC.

The PDCCH signal may include a Carrier Indicator Field (CIF) when the first CC is configured as downlink in the specific subframe timing and the PDCCH signal may be transmitted without a CIF when the first CC is configured as uplink in the specific subframe timing.

The control channel region of the second CC may be an Enhanced PDCCH (E-PDCCH) region of the second CC and the E-PDCCH region may indicate a PDCCH region assigned to a data region of a subframe.

The control channel signal may be a Physical Hybrid ARQ Indicator Channel (PHICH) signal for the second CC.

In another aspect of the present invention, there is provided a method for receiving a downlink signal by a user equipment for which cross-carrier scheduling via a first component carrier (CC) is configured in a TDD wireless communication system in which the first CC and a second CC are aggregated, the method including monitoring a control channel region for receiving a control channel signal in specific subframe timing in which the second CC is configured as downlink, wherein the monitoring of the control channel region includes monitoring a control channel region of the first CC when the first CC is configured as downlink in the specific subframe timing and monitoring a control channel region of the second CC when the first CC is configured as uplink in the specific subframe timing.

In a further aspect of the present invention, there is provided a user equipment in which cross-carrier scheduling via a first component carrier (CC) is configured in a TDD wireless communication system in which the first CC and a second CC are aggregated, the user equipment including an RF unit and a processor, wherein the processor is configured to monitor a control channel region for receiving a control channel signal in a specific subframe timing in which the second CC is configured as downlink, and wherein the monitoring of the control channel region includes monitoring a control channel region of the first CC when the first CC is configured as downlink in the specific subframe timing and monitoring a control channel region of the second CC when the first CC is configured as uplink in the specific subframe timing.

The control channel signal may be an uplink grant PDCCH signal or a downlink grant PDCCH signal for the second CC.

The control channel region of the second CC may be an E-PDCCH region of the second CC and the E-PDCCH region may indicate a PDCCH region assigned to a data region of a subframe.

The control channel signal may be a PHICH signal for the second CC.

Effects of the Invention

According to the present invention, it is possible to efficiently transmit and receive a signal in a wireless communication system supporting TDD. In addition, it is possible to efficiently transmit and receive a signal even in case that a plurality of component carriers having different TDD uplink-downlink configurations are carrier aggregated in a wireless communication system supporting TDD.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 11 illustrates half-duplex type Time Division Duplexing (TDD)-based carrier aggregation;

FIG. 12 illustrates full-duplex type TDD-based carrier aggregation;

BEST MODE

Embodiments of the present invention may be used in various wireless access systems such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as IEEE 802.11 (Wi-Fi), IEEE 802.16 (WiMAX), IEEE 802.20, and Evolved-UTRA (E-UTRA). UTRA is a part of Universal Mobile Telecommunication System (UMTS). Third Generation Partnership Project Long Term Evolution (3GPP LTE) is a part of Evolved-UMTS (E-UMTS) using E-UTRA. Long Term Evolution Advanced (LTE-A) is an evolution of 3GPP LTE. For clarity, the description focuses on 3GPP LTE/LTE-A. However, the technical features of the present invention are not limited thereto.

In a wireless communication system, a user equipment receives information from a base station on a downlink (DL) and transmits information to the base station on an uplink (UL). The information transmitted and received between the base station and the user equipment includes data and various types of control information. There are various physical channels according to the types/uses of information transmitted and received between the base station and the user equipment.

Figure 1:
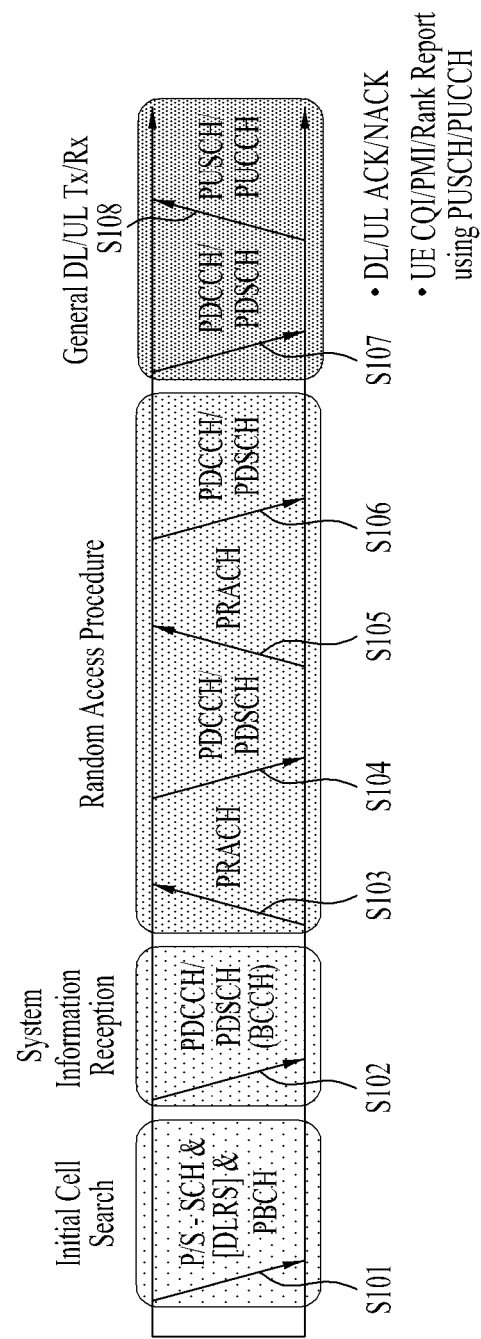
FIG. 1 illustrates physical channels, which may be used in a Third. Generation Partnership Project Long Term Evolution (3GPP LTE) system as an example of a wireless communication system, and a general signal transmitting method using the physical channels.

FIG. 1 is a view illustrating physical channels, which may be used in a 3GPP LTE system, and a general signal transmitting method using the physical channels.

When a user equipment is powered on or enters a new cell, the user equipment performs initial cell search for synchronization with a base station at step S101. To this end, the user equipment synchronizes its timing to the base station and acquires information such as a cell identity (ID) by receiving a Primary Synchronization Channel (P-SCH) and a Secondary Synchronization Channel (S-SCH) from the base station. Subsequently, the user equipment may acquire broadcast information in the cell by receiving a Physical Broadcast Channel (PBCH) from the base station. During the initial cell search, on the other hand, the user equipment may monitor a DL channel state by receiving a Downlink Reference Signal (DL RS).

After the initial cell search, the user equipment may acquire more detailed system information by receiving a Physical Downlink Control Channel (PDCCH) and receiving a Physical Downlink Shared Channel (PDSCH) based on information of the PDCCH at step S102.

Subsequently, in order to complete access to the base station, the user equipment may perform a random access procedure at steps S103 to S106. To this end, the user equipment may transmit a preamble on a Physical Random Access Channel (PRACH) (S103) and may receive a response message to the preamble on a PDCCH and a PDSCH corresponding to the PDCCH (S104). In the case of contention based random access, the user equipment may additionally perform a contention resolution procedure including transmission of an additional PRACH (S105) and reception of a PDCCH and a PDSCH corresponding to the PDCCH (S106).

After the above procedure, the user equipment may receive a PDCCH/PDSCH from the base station (S107) and transmit a Physical Uplink Shared Channel (PUSCH)/Physical Uplink Control Channel (PUCCH) to the base station (S108) as a general UL/DL signal transmission procedure. Control information that the user equipment transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), and Channel State Information (CSI). The CSI includes a Channel Quality Indicator (CQI), a Precoding Matrix Index (PMI), and a Rank Indication (RI). The UCI is generally transmitted on a PUCCH. In case that control information and traffic data are to be transmitted simultaneously, however, the UCI may be transmitted on a PUSCH. In addition, the UCI may be transmitted aperiodically on the PUSCH, according to a request/command of a network.

Figure 2:
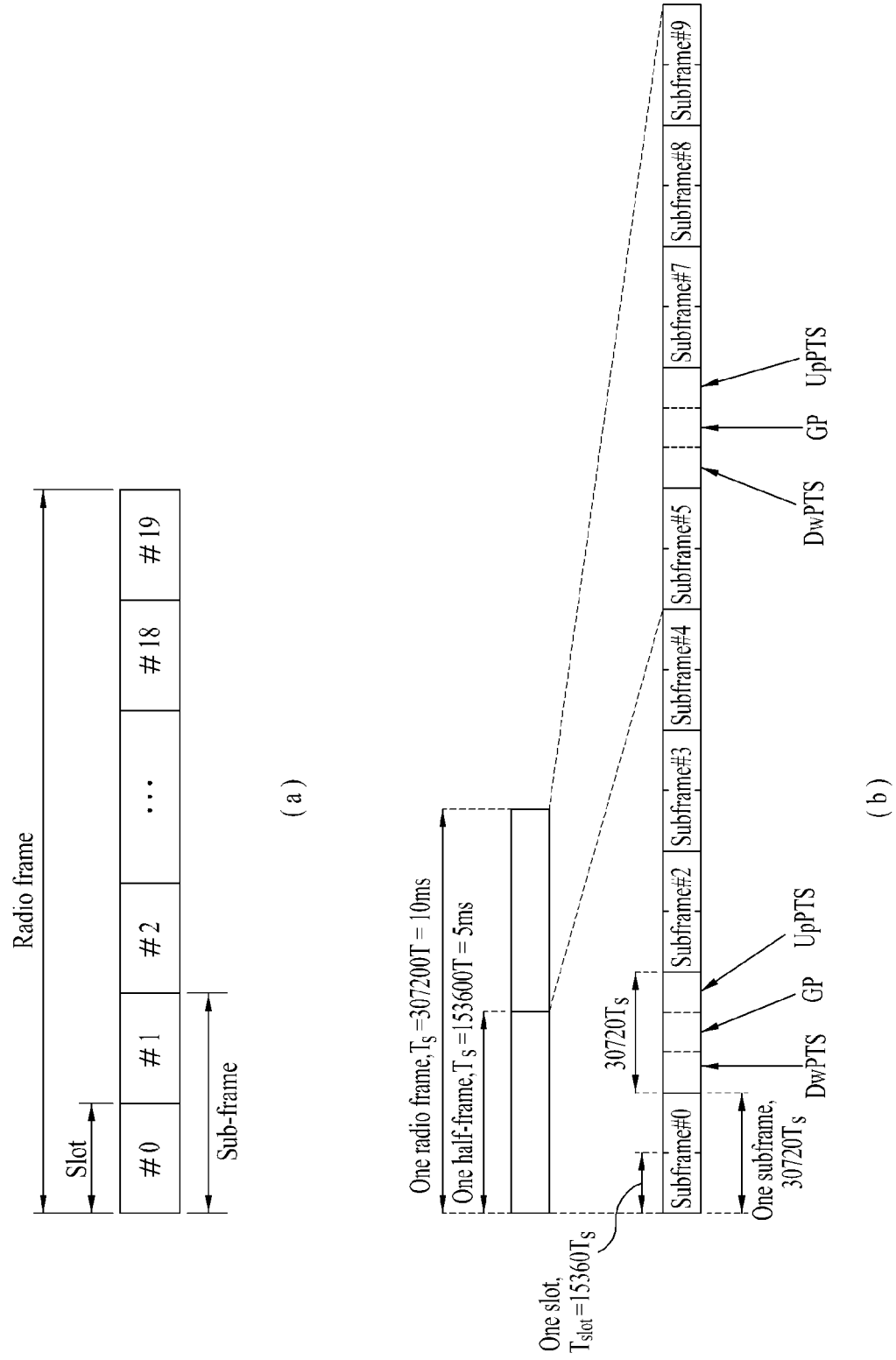
FIG. 2 illustrates a structure of a radio frame.

FIG. 2 illustrates a structure of a radio frame. In a cellular OFDM wireless packet communication system, UL/DL data packet transmission is performed on a per subframe (SF) basis. One subframe is defined as a predetermined time period including a plurality of Orthogonal Frequency Division Multiplexing (OFDM) symbols. In a 3GPP LTE standard, a structure of a type 1 radio frame applicable to Frequency Division Duplex (FDD) and a structure of a type 2 radio frame applicable to Time Division Duplex (TDD) are supported.

FIG. 2(a) illustrates a structure of a type 1 radio frame. A DL radio frame includes 10 subframes. One subframe includes two slots in a time domain. A time required for transmitting one subframe is defined as a transmission time interval (TTI). For example, a length of one subframe may be 1 ms and a length of one slot may be 0.5 ms. One slot includes a plurality of OFDM symbols in the time domain and includes a plurality of Resource Blocks (RBs) in a frequency domain. Since OFDM is used for DL in the 3GPP LIE system, one OFDM symbol represents one symbol period. An OFDM symbol may also be referred to as an SC-FDMA symbol or a symbol period. An RB, as a resource assignment unit, may include a plurality of contiguous subcarriers in one slot.

The number of OFDM symbols per slot may vary depending on a Cyclic Prefix (CP) configuration. The CP includes an extended CP and a normal CP. For example, in case that OFDM symbols are configured based on the normal CP, one slot may include 7 OFDM symbols. On the other hand, in case that OFDM symbols are configured based on the extended CP, a length of one OFDM symbol is increased. As a result, the number of OFDM symbols in case of the extended CP is less than that of OFDM symbols in case of the normal CP. For example, one slot may include 6 OFDM symbols in case of the extended CP. In case that a channel state is unstable, e.g. in case that the user equipment moves at a high speed, the extended CP may be used to further reduce interference between the symbols.

In case that the normal CP is used, one subframe includes 14 OFDM symbols since one slot includes 7 OFDM symbols. A maximum of 3 front OFDM symbols of the subframe may be assigned to a Physical Downlink Control Channel (PDCCH) and the other OFDM symbols may be assigned to a Physical Downlink Shared Channel (PDSCH).

FIG. 2(b) illustrates a structure of a type 2 radio frame. The type 2 radio frame includes two half frames. Each half frame includes five subframes. Each subframes includes a Downlink Pilot Time Slot (DwPTS), a Guard Period (GP), and an Uplink Pilot Time Slot (UpPTS). One subframe includes two slots. The DwPTS is used for initial cell search, synchronization, or channel estimation at a user equipment. The UpPTS is used for channel estimation and UL transmission synchronization with a user equipment at a base station. The GP is used to remove UL interference between a UL and a DL caused due to the multi-path delay of a DL signal. Table 1 illustrates an Uplink-Downlink (DL-UL) Configuration of subframes in a wireless frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D indicates a downlink subframe (DL SF), U indicates an uplink subframe (UL SF), and S indicates a special subframe. The special subframe includes a DwPTS, a GP, and an UpPTS. Table 2 illustrates special subframe configurations.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the wireless frame is merely illustrative. The number of subframes included in the wireless frame, the number of slots included in each subframe, or the number of symbols included in each slot may be variously changed.

Figure 3:
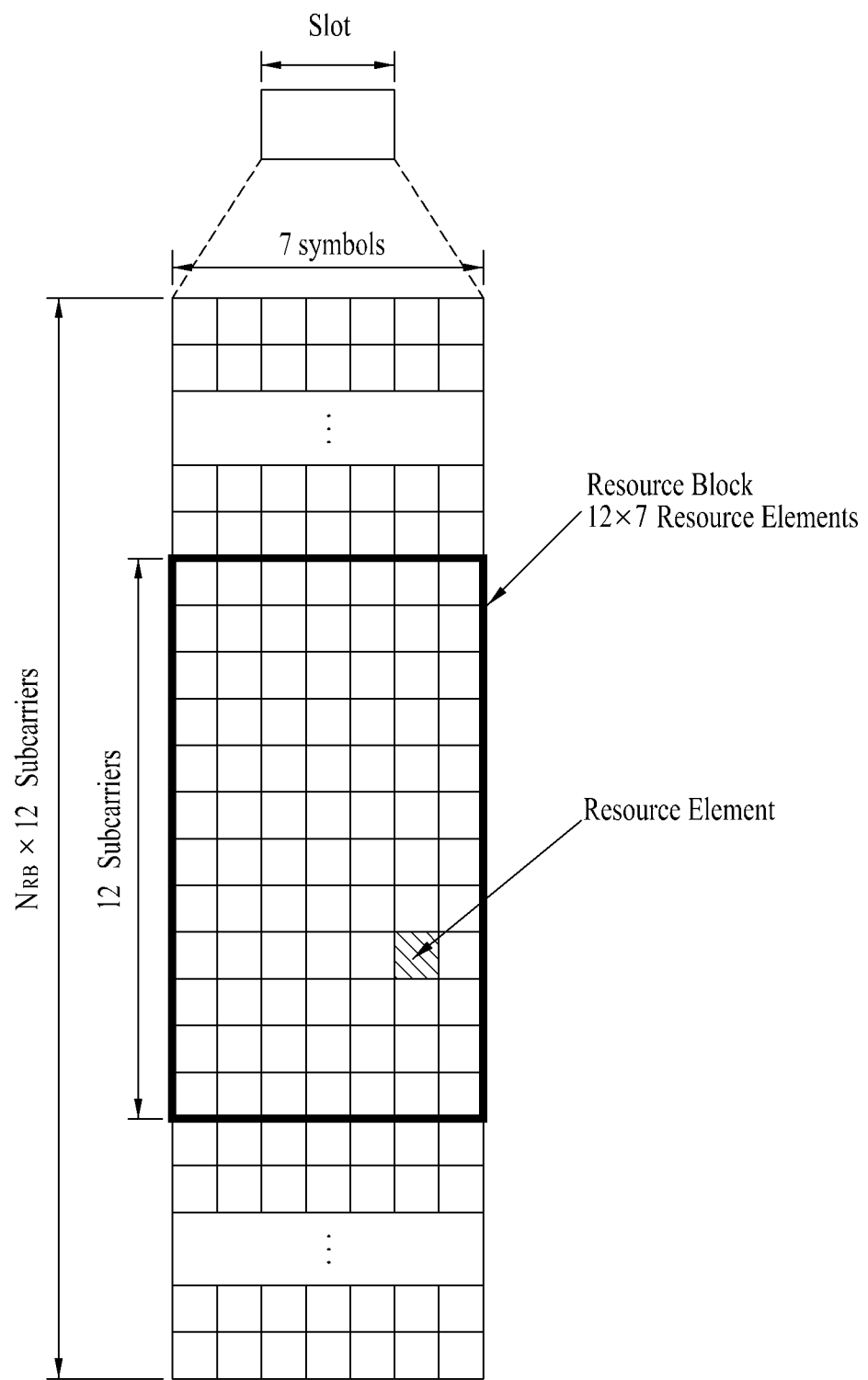
FIG. 3 illustrates a resource grid for a downlink slot.

FIG. 3 illustrates a resource grid for a DL slot.

Referring to FIG. 3, a DL slot includes a plurality of OFDM symbols in the time domain. In the drawing, One DL slot includes 7 OFDM symbols and one resource block (RB) includes 12 subcarriers in the frequency domain. However, the present invention is not limited thereto. Each element on the resource grid is referred to as a resource element (RE). One RB includes 12×7 REs. The number $N_{DL}$ of RBs in a DL slot depends on a DL transmission band. A UL slot may have the same structure as a DL slot.

Figure 4:
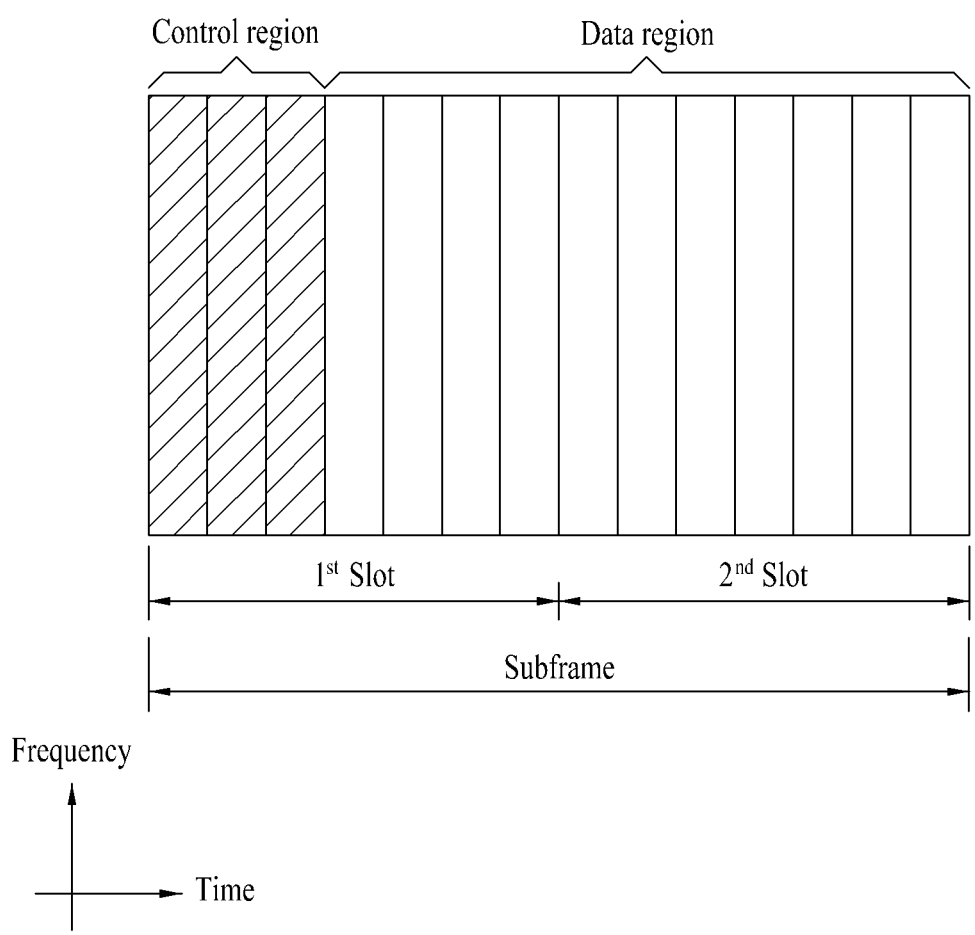
FIG. 4 illustrates a structure of a downlink subframe.

FIG. 4 illustrates a structure of a downlink subframe.

Referring to FIG. 4, a maximum of 3 (4) front OFDM symbols of the first slot in the subframe correspond to a control region to which control channels are assigned. The other OFDM symbols correspond to a data region to which a Physical Downlink Shared Channel (PDSCH) is assigned. A basic resource unit of the data region is an RB. Examples of downlink control channels used in LTE include a Physical Control Format Indicator Channel (PCFICH), a Physical Downlink Control Channel (PDCCH), and a Physical Hybrid ARQ Indicator Channel (PHICH). The PCFICH is transmitted in the first OFDM symbol of a subframe, carrying information about the number of OFDM symbols used for transmission of control channels in the subframe. The PHICH is a response to a UL transmission, delivering an acknowledgment/negative-acknowledgment (HARQ ACK/NACK) signal. Control information transmitted on the PDCCH is referred to as Downlink Control Information (DCI). The DCI includes UL or DL scheduling information or a UL Transmit Power Control Command for any user equipment group.

DCI formats are defined as formats 0, 3, 3A, and 4 for UL and formats 1, 1A, 1B, 1C, 1D, 2, 2A, 2B, and 2C for DL. Types of information fields, the number of information fields, and the number of bits of each information field vary according to the DCI formats. For example, the DCI formats selectively include information, such as a hopping flag, RB assignment, a modulation coding scheme (MCS), a redundancy version (RV), a new data indicator (NDI), transmit power control (TPC), a HARQ process number, and confirmation of a precoding matrix indicator (PMI) according to use. According to the DCI formats, therefore, the size of control information matched with the DCI formats varies. Meanwhile, any DCI format may be used to transmit two or more kinds of control information. For example, DCI format 0/1A is used to carry DCI format 0 or DCI format 1. These formats may be differentiated by a flag field.

The PDCCH may deliver information about a transport format and resource assignment for a Downlink Shared Channel (DL-SCH), information about resource assignment for an Uplink Shared Channel (UL-SCH), paging information of a paging channel (PCH), system information on the DL-SCH, information about resource assignment for an upper layer control message such as a random access response transmitted on the PDSCH, a transmit power control command for each individual user equipment of any user equipment group, voice over Internet protocol (VoIP) activation, etc. A plurality of PDCCHs may be transmitted in the control region. The user equipment may monitor a plurality of PDCCHs. A PDCCH is transmitted in an aggregation of one or more consecutive control channel elements (CCEs). A CCE is a logical assignment unit used to provide a PDCCH at a predetermined coding rate based on the state of a radio channel. A CCE corresponds to a plurality of resource element groups (REGs). The format of a PDCCH and the number of available bits for the PDCCH are decided according to the relationship between the number of CCEs and a coding rate provided by the CCEs. The base station decides a PDCCH format according to DCI that will be transmitted to the user equipment and adds a cyclic redundancy check (CRC) to the control information. The CRC is masked by a unique identifier (ID) (referred to as a radio network temporary identifier (RNTI)) according to the owner or use of the PDCCH. In case that the PDCCH is destined for a specific user equipment, the CRC may be masked by a unique ID (for example, a cell-RNTI (C-RNTI)) of the user equipment. In another example, in case that the PDCCH is destined for a paging message, the CRC may be masked by a paging indication ID (for example, a Paging-RNTI (P-RNTI)). In case that the PDCCH is destined for system information (more specifically, a system information block (SIB), which will hereinafter be described), the CRC may be masked by a system information ID (for example, a system information RNTI (SI-RNTI)). In order to indicate a random access response, which is a response to a random access preamble transmitted by the user equipment, the CRC is masked by a random access-RNTI (RA-RNTI).

The PDCCH carries a message known as Downlink Control Information (DCI) and the DCI includes resource assignment or other control information for one user equipment or a user equipment group. In general, a plurality of PDCCHs may be transmitted in one subframe. Each PDCCH is transmitted using one or more control channel elements (CCEs). Each CCE corresponds to 9 sets of 4 resource elements. 4 resource elements are referred to as a resource element group (REG). 4 QPSK symbols are mapped to one REG. A resource element assigned to a reference signal is not included in a REG. As a result, the total number of REGs in a given OFDM symbol varies depending upon whether a cell-specific reference signal is present. The REG concept (i.e. mapping per group, each group including 4 resource elements) is also used in other different DL control channels (PCFICH and PHICH). That is, the REG is used as a basic resource unit of the control region. 4 PDCCH formats are supported as listed in Table 3

TABLE 3

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are successively numbered. In order to simplify a decoding process, a PDCCH having a format including n CCEs may start only with a CCE having a number equal to a multiple of n. The number of CCEs used for transmission of a specific PDCCH is decided by the base station according to a channel state. For example, one CCE is sufficient for a PDCCH directed to a user equipment having a good DL channel (for example, a user equipment adjacent to the base station). On the other hand, 8 CCEs may be used for a PDCCH directed to a user equipment in a poor DL channel state (for example, a user equipment adjacent to a cell interface) in order to ensure sufficient robustness. In addition, a power level of the PDCCH may be adjusted based on the channel state.

A method introduced to LTE is to define the position of a restricted set of CCEs in which the PDCCH may be positioned for each user equipment. The position of a restricted set of CCEs in which the user equipment may find its own PDCCH may be referred to as a search space (SS). In LTE, the SS may have a different size for each PDCCH format. In addition, a UE-specific search space and a common search space are separately defined. The UE-specific search space is individually configured for each user equipment and a range of the common search space is known to all user equipments. The UE-specific search space and the common search space may overlap for a given user equipment. In case that the search space is very small, there are no remaining CCEs if the position of some CCEs is assigned to a search space for a specific user equipment. As a result, the base station may not find CCE resources through which the PDCCH will be transmitted to all available user equipments in a given subframe. In order to minimize a possibility of the above blocking being connected to the next subframe, a UE-specific hopping sequence is applied to the starting position of the UE-specific search space.

Table 4 shows sizes of the common search space and the UE-specific search space.

TABLE 4

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

In order to regulate calculation load caused by the total number of times of blind decoding, the user equipment is not required to simultaneously search for all defined DCI formats. In general, the user equipment always searches for format 0 and format 1A in the UE-specific search space. Format 0 and format 1A are of the same size and are differentiated by a flag in a message. In addition, the user equipment may be required to receive an additional format (for example, 1, 1B, or 2 according to a PDSCH transmission mode configured by the base station). In the common search space, the user equipment searches for format 1A and format 1C. In addition, the user equipment may be configured to search for format 3 or format 3A. Format 3 and format 3A may have the same size and may be differentiated by scrambling a CRC using different (common) identifiers instead of a UE-specific identifier. Transmission modes for configuring a multi-antenna technology and information content of DCI formats are listed below.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user multiple input multiple output (MIMO)
Transmission mode 6: Closed-loop rank-1 precoding
Transmission mode 7: Transmission using a UE-specific reference signal DCI Formats
Format 0: Resource grants for PUSCH transmissions (uplink)
Format 1: Resource assignments for signal codeword PDSCH transmissions (transmission modes 1, 2, and 7)
Format 1A: Compact signaling of resource assignments for signal codeword PDSCH transmissions (all modes)
Format 1B: Compact resource assignments for PDSCH (mode 6) using rank-1 closed loop precoding
Format 1C: Very compact resource assignments for PDSCH (for example, paging/broadcast system information)
Format 1D: Compact resource assignments for PDSCH (mode 5) using multi-user MIMO
Format 2: Resource assignments for PDSCH (mode 4) for closed loop MIMO operation
Format 2A: Resource assignments for PDSCH (mode 3) for open loop MIMO operation
Format 3/3A: Power control commands for PUCCH and PUSCH with a 2-bit/1-bit power adjustment value When considering the above, the user equipment is required to perform blind decoding a maximum of 44 times in one subframe. Checking the same message using different CRC values requires only trivial additional calculation complexity. For this reason, checking the same message using different CRC values is not included in the number of times of blind decoding.

Figure 5:
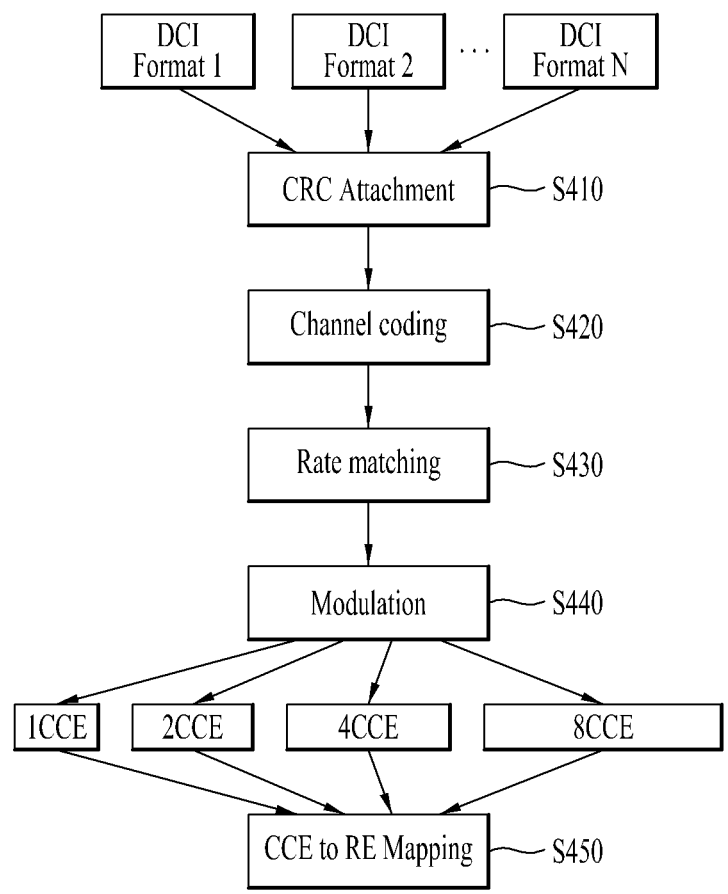
FIG. 5 illustrates a physical downlink control channel (PDCCH) configuration process performed by a base station.

FIG. 5 is a flowchart showing a PDCCH configuration process performed by the base station.

Referring to FIG. 5, the base station generates control information according to DCI formats. The base station may select one DCI format from among a plurality of DCI formats (DCI formats 1, 2, . . . , N) according to control information to be transmitted to the user equipment. At step S410, the base station attaches cyclic redundancy check (CRC) for error detection to control information generated according to each DCI format. The CRC is masked by an identifier (for example, a Radio Network Temporary Identifier (RNTI)) according to the owner or use of the PDCCH. In other words, the PDCCH is CRC scrambled by an identifier (for example, RNTI).

Table 5 shows examples of identifiers masked to the PDCCH.

TABLE 5

| Type | Identifier | Description |
|---|---|---|
| UE-specific | C-RNTI, temporary C-RNTI, semi-persistent C-RNTI | Used for unique identification of UE |
| Common | P-RNTI | Used for paging message |
|  | SI-RNTI | Used for system information |
|  | RA-RNTI | Used for random access response |

In case that a C-RNTI, a temporary C-RNTI, or a semi-persistent C-RNTI is used, the PDCCH carries control information for a corresponding specific user equipment. In case that other RNTIs are used, the PDCCH carries common control information received by all user equipments in the cell. At step S420, the base station performs channel coding on control information to which the CRC is added to generate coded data (codeword). At step S430, the base station performs rate matching according to a CCE aggregation level assigned to the PDCCH format. At step S440, the base station modulates the coded data to generate modulated symbols. Modulated symbols constituting one PDCCH may have a CCE aggregation level selected from among 1, 2, 4, and 8. At step S450, the base station maps the modulated symbols to physical resource elements (REs) (CCE to RE mapping).

Figure 6:
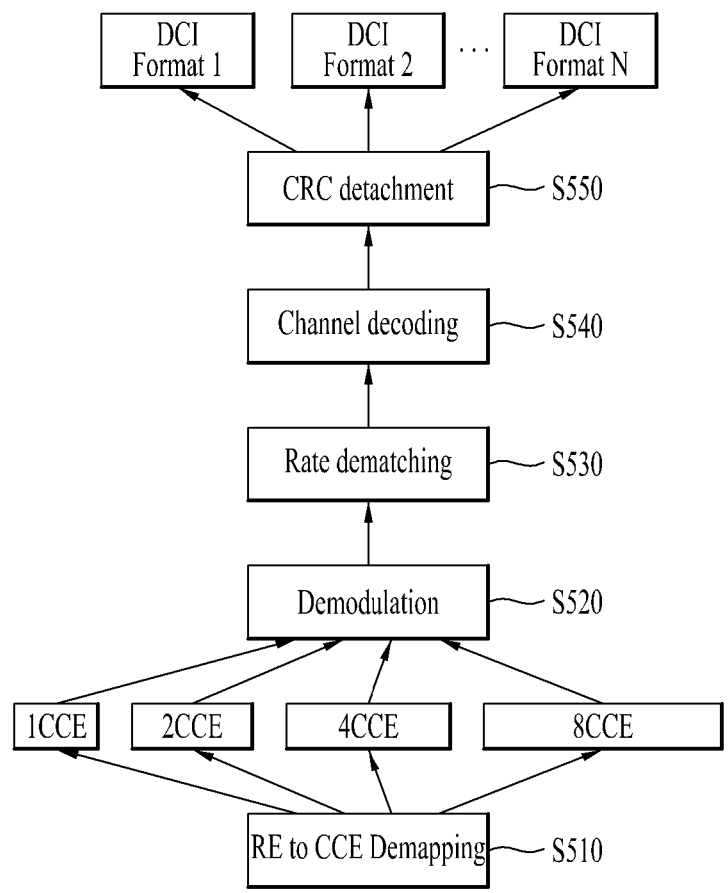
FIG. 6 illustrates a PDCCH processing process performed by a user equipment.

FIG. 6 illustrates a PDCCH processing process performed by the user equipment.

Referring to FIG. 6, at step S510, the user equipment demaps physical resource elements (REs) to CCEs (RE to CCE demapping). At step S520, the user equipment demodulates the respective CCE aggregation level because the user equipment does not know through which CCE aggregation level the user equipment will receive the PDCCH. At step S530, the user equipment performs rate dematching on the demodulated data. Since the user equipment does not know what DCI format (or what DCI payload size) the user equipment that will receive control information has, the user equipment performs rate dematching on the respective DCI format (or DCI payload sizes). At step S540, the user equipment performs channel decoding on the rate dematched data according to a coding rate and checks a CRC to detect whether an error has occurred. In case that the error has not occurred, it means that the user equipment detected its own PDCCH. On the other hand, in case that the error has occurred, the user equipment continues to perform blind decoding for another CCE aggregation level or another DCI format (or another DCI payload size). At step S550, the user equipment having detected its own PDCCH removes the CRC from the decoded data to acquire control information.

A plurality of PDCCHs for a plurality of user equipments may be transmitted in a control region of the same subframe. The base station does not provide the user equipment with information about the position of a corresponding PDCCH in the control region. Consequently, the user equipment searches for its own PDCCH by monitoring a set of PDCCH candidates in the subframe. Monitoring means the user equipment attempting to decode the received PDCCH candidates according to the respective DCI formats. This is called blind decoding or blind detection. Through blind decoding, the user equipment simultaneously performs identification of the PDCCH transmitted to the user equipment and decoding of control information transmitted via the corresponding PDCCH. For example, if there is no CRC error in case that the PDCCH is demasked by a C-RNTI, it means that the user equipment detected its own PDCCH.

Meanwhile, in order to reduce overhead of blind decoding, definition is given such that the number of DCI formats is less than kinds of control information transmitted using the PDCCH. The DCI formats include a plurality of different information fields. Types of information fields, the number of information fields, and the number of bits of each information field vary according to the DCI formats. In addition, the size of control information matched with the DCI formats varies according to the DCI formats. Any DCI format may be used to transmit two or more kinds of control information.

Table 6 shows an example of control information transmitted by DCI format 0. The bit size of each information field below is merely illustrative and the bit size of each information field is not limited thereto.

TABLE 6

| Field | Bit(s) |
|---|---|
| Flag for determining DCI format 0/1A | 1 |
| Hopping flag | 1 |
| RB assignment | $\lceil \log_2(N_{RB}^{UL}(N_{RB}^{UL} + 1)/2) \rceil$ |
| MCS (Modulation and coding scheme) and RV (Redundancy Version) | 5 |
| NDI (New Data Indicator) | 1 |
| TPC (Transmit Power Control) command for scheduled PUSCH | 2 |
| Cyclic shift for DM RS | 3 |
| UL index (TDD) | 2 |
| CQI request | 1 |

The flag field is an information field for differentiating between format 0 and format 1A. That is, DCI format 0 and DCI format 1A have the same payload size and are differentiated by a flag field. For the resource block assignment and hopping resource allocation field, the bit size of the field may vary according to a hopping PUSCH or a non-hopping PUSCH. The resource block assignment and hopping resource allocation field for the non hopping PUSCH provides $\lceil \log_2(N_{RB}^{UL}(N_{RB}^{UL}+1)/2) \rceil$ bits for resource assignment to the first slot in the UL subframe. Where $N_{TB}^{UL}$ is a number of resource block included in the UL slot, which is decided according to a UL transmission bandwidth configured in the cell. Consequently, the payload size of DCI format 0 may vary according to a UL bandwidth. DCI format 1A includes an information field for PDSCH assignment. The payload size of DCI format 1A may also vary according to a DL bandwidth. DCI format 1A provides a reference information bit size for DCI format 0. In case that the number of information bits of DCI format 0 is less than that of information bits of DCI format 1A, therefore, '0' is added to DCI format 0 until the payload size of DCI format 0 is equal to the payload size of DCI format 1A. The added '0' fills a padding field of the DCI format.

Figure 7:
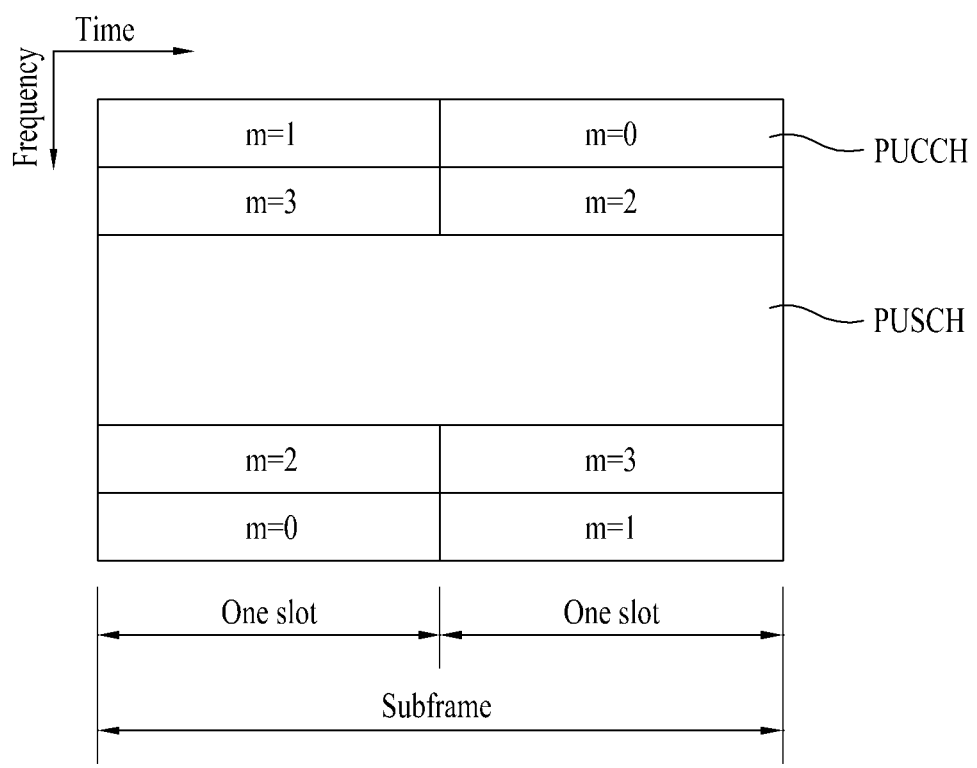
FIG. 7 illustrates a structure of an uplink subframe.

FIG. 7 illustrates a structure of an uplink subframe used in LTE.

Referring to FIG. 7, an uplink subframe includes a plurality of (for example, two) slots. A slot may include a different number of SC-FDMA symbols according to the length of a CP. For example, in case of a normal CP, a slot may include 7 SC-FDMA symbols. In a frequency domain, the uplink subframe is divided into a data region and a control region. The data region includes a PUSCH and is used to transmit a data signal such as a voice. The control region includes a PUCCH and is used to transmit control information. The PUCCH includes an RB pair (for example, m=0, 1, 2, and 3) located at both ends of the data region on a frequency axis and the RB pair is hopped on a slot basis. Control information includes an HARQ ACK/NACK, Channel Quality Information (CQI), a Precoding Matrix Indicator (PMI), and a Rank Indication (RI).

Figure 8:
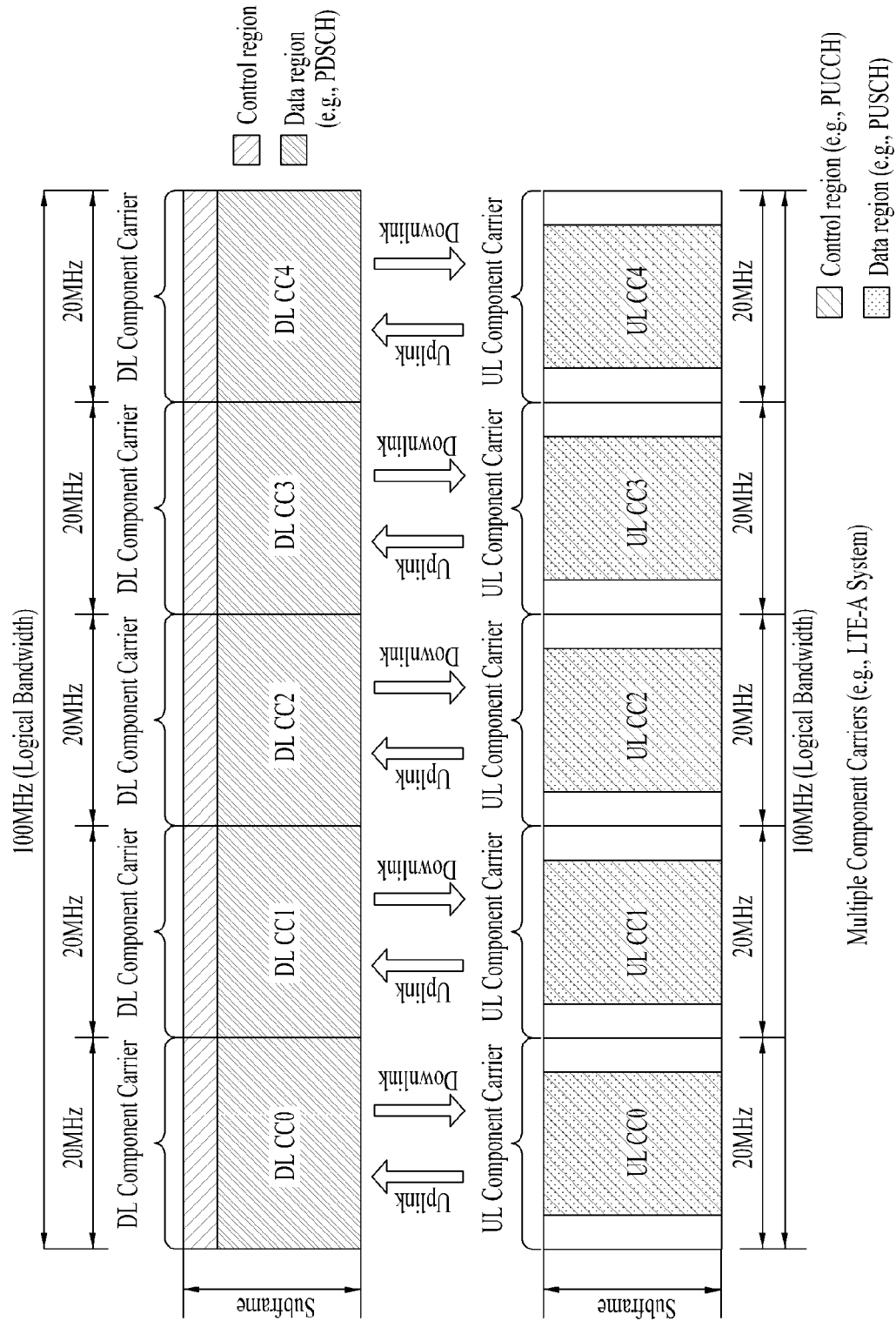
FIG. 8 illustrates a Carrier Aggregation (CA) communication system.

FIG. 8 illustrates a Carrier Aggregation (CA) communication system.

Referring to FIG. 8, a plurality of UL/DL Component Carriers (CCs) may be collected to support a wider UL/DL bandwidth. The respective CCs may be or may not be adjacent to each other in a frequency region. A bandwidth of each component carrier may be independently decided. Asymmetric carrier aggregation, in which the number of UL CCs is different from the number of DL CCs, may be possible. Meanwhile, control information may be configured to be transmitted and received via a specific CC. Such a specific CC may be referred to as a Primary CC (PCC) and the other CCs may be referred to as Secondary CCs (SCCs). The PCC may be used for the user equipment to perform an initial connection establishment process or a connection reestablishment process. The PCC may be referred to as a cell indicated during a handover process. The SCCs may be configured after RRC connection establishment is achieved and may be used to provided additional radio resources. For example, in case that cross-carrier scheduling (or cross-CC scheduling) is applied, a PDCCH for DL assignment may be transmitted in DL CC#0 and a corresponding PDSCH may be transmitted in DL CC#2. The term "component carrier" may be replaced with other equivalent terms (for example, a carrier, a cell, etc.)

A carrier indicator field (CIF) is used for cross-CC scheduling. Setting for CIF presence or absence in a PDCCH may be semi-statically and UE-specifically (or UE group-specifically) enabled by an upper layer signal (for example, RRC signaling). Basic items of PDCCH transmission may be listed as follows.

CIF disabled: A PDCCH on a DL CC assigns a PDSCH resource on the same DL CC and a PUSCH resource on a single linked UL CC.

CIF absence

CIF enabled: A PDCCH on a DL CC may assign a PDSCH or PUSCH resource one DL/UL CC selected from among a plurality of aggregated DL/UL CCs using a CIF.

an LTE DCI format extended to have a CIF

A CIF (if configured) is a fixed x-bit field (for example, x=3)

Location of a CIF (if configured) is fixed irrespective of a DCI format size

In case that a CIF is present, the base station may assign a monitoring DL CC (set) to reduce blind detection complexity at the user equipment side. The user equipment may perform PDCCH detection/decoding only in a corresponding DL CC for PDSCH/PUSCH scheduling. In addition, the base station may transmit a PDCCH via a monitoring DL CC (set). The monitoring DL CC set may be configured based on a UE-specific, UE group-specific, or cell-specific scheme.

Figure 9:
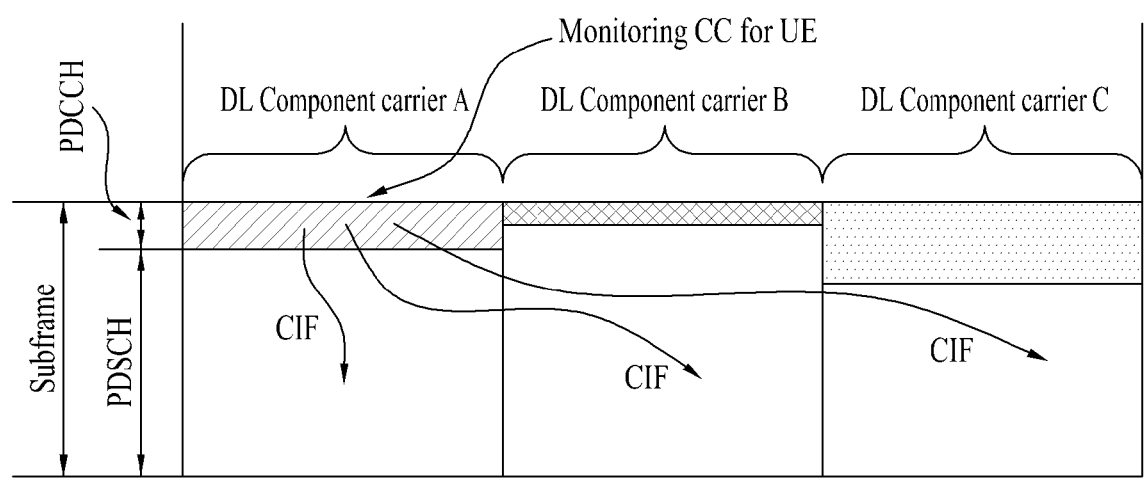
FIG. 9 illustrates cross-carrier scheduling.

FIG. 9 illustrates a case in which three DL CCs are aggregated and DL CC A is configured as a monitoring DL CC. When the CIF is disabled, each DL CC may transmit only a PDCCH scheduling a PDSCH of each DL CC without the CIF according to LTE PDCCH rules. On the other hand, when the CIF is enabled by upper layer signaling, only DL CC A may transmit a PDCCH scheduling not only a PDSCH of DL CC A but also a PDSCH of another DL CC using the CIF. In DL CC B and DL CC C, which are not configured as monitoring DL CC, no PDCCH is transmitted. The term "monitoring CC (MCC)" may be replaced with equivalent terms such as a monitoring carrier, a monitoring cell, a scheduling carrier, a scheduling cell, a serving carrier, and a serving cell. A DL CC in which a PDSCH corresponding to a PDCCH is transmitted and a UL CC in which a PUSCH corresponding to a PDCCH is transmitted may be referred to as scheduled carriers or scheduled cells.

In a 3GPP LTE/LTE-A system, FDD DL carriers and TDD DL subframes use first n OFDM symbols of the subframes for transmission of PDCCH, PHICH, and PCFICH, which are physical channels for transmission of various kinds of control information, and the other OFDM symbols for PDSCH transmission as previously described with reference to FIG. 4. The number of symbols used for control channel transmission in each subframe is transmitted to the user equipment dynamically via a physical channel, such as PCFICH, or semi-statically through RRC signaling. A value of n may be configured to one symbol to a maximum of four symbols based on subframe characteristics and system characteristics (FDD/TDD, system band, etc.). In a legacy LTE system, on the other hand, a physical channel, such as PDCCH, for DL/UL scheduling and transmission of various kinds of control information is transmitted through a restricted OFDM symbol(s). Consequently, it is possible to introduce an Enhanced PDCCH (E-PDCCH) in which PDSCH is more freely multiplexed based on FDM/TDM instead of a control channel structure in which PDCCH is transmitted through an OFDM symbol separated from PDSCH.

Figure 10:
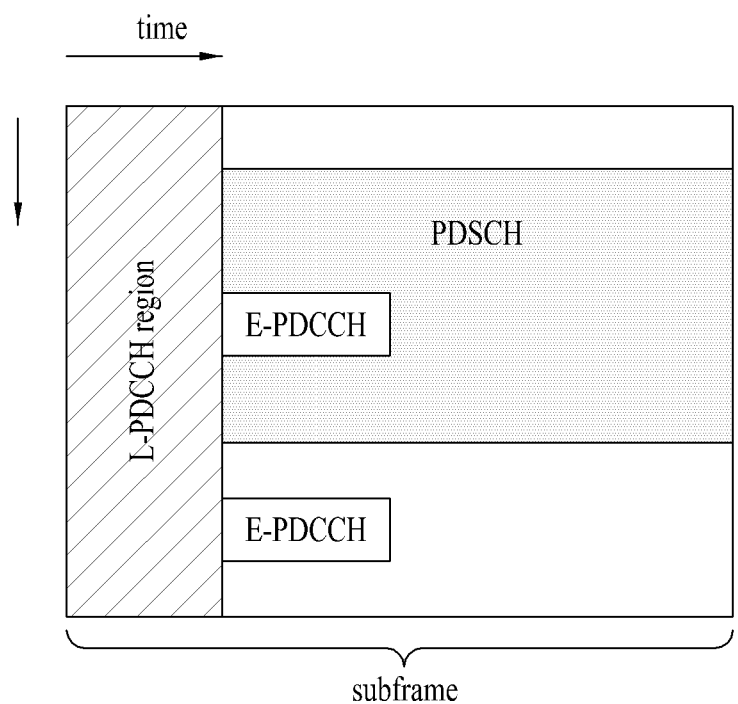
FIG. 10 illustrates an example of assigning a PDCCH to a data region of a subframe.

FIG. 10 illustrates an example of assigning a downlink physical channel to a subframe when the E-PDCCH is applied.

Referring to FIG. 10, a PDCCH according to legacy LTE/LTE-A (for the sake of convenience, referred to as Legacy PDCCH or L-PDCCH) may be assigned to a control region (see FIG. 4) of the subframe. In the drawing, an L-PDCCH region means a region to which the legacy PDCCH may be assigned. According to context, the L-PDCCH region may mean a control region, a control channel resource region (i.e. a CCE resource) to which the PDCCH may be really assigned in the control region, or a PDCCH search space. On the other hand, the PDCCH may be further assigned in the data region (for example, a resource region for a PDSCH, see FIG. 4). The PDCCH assigned to the data region is referred to as an E-PDCCH. In the drawing, one E-PDCCH is shown as being included in one slot. However, this configuration is illustrative. The E-PDCCH may be present on a per subframe basis (that is, over two slots). Alternatively, the E-PDCCH may be present on a per subframe basis or on a per slot basis.

As illustrated in FIG. 10, the existing L-PDCCH, the PDSCH, and the E-PDCCH may be multiplexed. At this time, whether the PDCCH is transmitted via the L-PDCCH region or the E-PDCCH region (that is, whether the search space for detecting the PDCCH is configured on the L-PDCCH region or the E-PDCCH region) may be configured semi-statically through upper layer signaling (for example, RRC signaling).

Hereinafter, a scheme for assigning and using a resource for a downlink control channel using a data region (for example, PDSCH) of a subframe will be described with reference to the drawing. For the sake of convenience, the following description focuses on a relationship between the base station and the user equipment. However, the present invention may be identically/similarly applied to a relationship between the base station and the relay or between the relay and the user equipment. In the following description, therefore, the relationship between the base station and the user equipment may be replaced with the relationship between the base station and the relay or between the relay and the user equipment. From the viewpoint of signal reception, the relay and the user equipment may be generalized as a receiving end. In case that the relay operates as the receiving end, an E-PDCCH may be replaced with a Relay-PDCCH (R-PDCCH).

First, the E-PDCCH will be described in more detail. The E-PDCCH carries DCI. Details of the DCI refer to the above description. For example, the E-PDCCH may carry DL scheduling information and UL scheduling information. An E-PDCCH/PDSCH process and an E-PDCCH/PUSCH process are identical/similar to what was described with reference to steps S107 and S108 of FIG. 1. That is, the user equipment may receive the E-PDCCH and receive data/control information via a PDSCH corresponding to the E-PDCCH. In addition, the user equipment may receive the E-PDCCH and transmit data/control information via a PUSCH corresponding to the E-PDCCH. E-PDCCH transmission processing (for example, channel coding, interleaving, multiplexing, etc.) may be performed using the processing (see FIGS. 5 and 6) defined in the existing LTE within a possible range and may be modified as needed.

On the other hand, the legacy LTE adopts a method of pre-reserving a PDCCH candidate region (hereinafter, a PDCCH search space) in the control region and transmitting a PDCCH of a specific user equipment to a portion of the region. Consequently, the user equipment may obtain its own PDCCH in the PDCCH search space through blind decoding. Similarly, the E-PDCCH may also transmitted over some or entirety of the pre-reserved resources.

A scheme in which aggregation of a plurality of CCs (that is, carrier aggregation) is supported and ACK/NACK for DL data (for example, data transmitted via a PDSCH) transmitted via a plurality of CCs is transmitted via only a specific CC (for example, PCC) is considered in LTE-A. As previously described, CCs other than the PCC may be referred to as SCCs. In addition, cross-CC scheduling may be supported during carrier aggregation in LTE-A. In this case, one CC (for example, scheduled CC) may be preset to be DL/UL scheduled via one specific CC (for example, scheduling CC) (that is, to receive a DL/UL grant PDCCH for the scheduled CC). Basically, the scheduling CC may perform DL/UL scheduling of the scheduling CC. ACK/NACK for UL data (for example, data transmitted via a PUSCH) transmitted via the scheduling/scheduled CC may be transmitted via the scheduling CC (that is, a PHICH of the scheduling CC). The scheduling CC may be referred to as a monitoring CC (MCC), the scheduled CC may be referred to as a secondary CC (SCC), and the ACK/NACK for UL data may be referred to as a PHICH. The entirety of a search space (CC) configured to detect a PDCCH scheduling an MCC/SCC having a cross-CC scheduling relationship (that is, in which blind detection for a PDCCH is performed) is present in a control channel region of the MCC. Cross-CC scheduling may be an operation preferably when a control channel region of the SCC is not suitable for PDCCH transmission due to interference and channel state from the viewpoint of the user equipment).

Meanwhile, aggregation of a plurality of CCs operating in different UL-DL configurations may be considered in a TDD-based beyond LTE-A system. In this case, ACK/NACK timing configured for the PCC (a UL-DL configuration of the PCC) may be different from ACK/NACK timing configured for the SCC (a UL-DL configuration of the SCC). In other words, UL subframe (SF) timing in which ACK/NACK for DL data transmitted through respective DL subframes (SFs) is transmitted may vary. For example, UL SF timing in which ACK/NACK for DL data transmitted in the same DL SF timing is transmitted may be configured to vary between the PCC and the SCC. Similarly, a DL SF group, to which an ACK/NACK feedback transmitted in the same UL SF timing is provided, may be configured to vary between the PCC and the SCC. In addition, a PCC and SCC link direction (i.e. DL or UL) may be configured to vary in the same SF timing. For example, the SCC may be configured as a UL SF (in which ACK/NACK will be transmitted) in a specific SF timing, whereas the PCC may be configured as a DL SF in the specific subframe timing.

In addition, even in case of carrier aggregation based on different UL-DL configurations as described above, cross-CC scheduling may be supported. In this case, UL grant and PHICH timing configured for an MCC may be different from UL grant and PHICH timing configured for an SCC. In other words, DL SF timing in which an UL grant scheduling UL data to be transmitted through respective UL SFs is transmitted and a PHICH for corresponding UL Data is transmitted may vary between the MCC and the SCC. For example, DL SF timing in which a UL grant/PHICH for UL data transmitted in the same UL SF timing is transmitted may be configured to vary between the MCC and the SCC. Similarly, a UL SF group, to which a UL grant or PHICH feedback transmitted in the same DL SF timing is provided, may be configured to vary between the MCC and the SCC.

Figure 11:
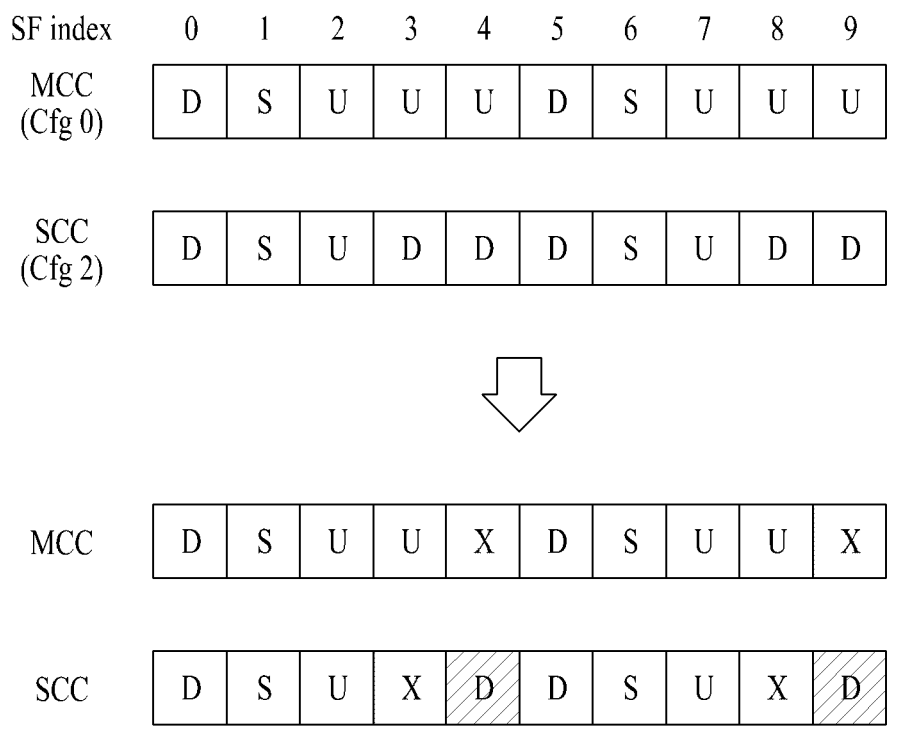

FIG. 11 illustrates half-duplex type TDD-based carrier aggregation.

Referring to FIG. 11, in case of TDD-based carrier aggregation, a scheme in which only CCs having a specific link direction or the same link direction as a specific CC (for example, PCC or MCC) are used in SF timing in which MCC and SCC link directions are different from each other according to a hardware configuration or other reason/purpose of the user equipment may be considered. This scheme is referred to as a half-duplex scheme and half-duplex type TDD-based carrier aggregation is referred to as HD-TDD CA. In addition, in case of TDD-based carrier aggregation, a SF having different link directions of corresponding CCs in specific SF timing is referred to as a collided subframe (SF). For example, in specific SF timing, an MCC may be configured as a DL SF and an SCC may be configured as a UL SF to form a collided SF. In a collided SF timing, only an MCC having a DL direction (that is, a DL SF configured in the MCC) may be used and an SCC having a UL direction (that is, a UL SF configured in the SCC) may not be used (and vice versa). In this case, in a situation in which the MCC is configured as UL SF and the SCC is configured as DL SF in specific collided SF timing, if only the DL SF of the SCC having the DL direction is used but the UL SF of the MCC is not used for HD-TDD CA operation, a DL grant PDCCH scheduling SCC DL data (that is, DL data transmitted via the SCC) in the corresponding collided SF cannot be transmitted via the MCC when a cross-CC scheduling relationship from the MCC to the SCC is configured. An example of such an HD-TDD CA structure is illustrated in FIG. 11. In the drawing, a SF denoted by "X" indicates a SF (or link direction) of CC which are limited for use in a collided SF (for the sake of convenience, referred to as "X" SF). In case of the SCC DL SF, a shaded SF indicate examples of collided SF in which DL data scheduling cannot be received from the MCC during cross-CC scheduling. That is, in case of the shaded collided SF, a DL grant PDCCH scheduling SCC DL SF cannot be transmitted via the MCC.

FIG. 12 illustrates full-duplex type TDD-based carrier aggregation.

Referring to FIG. 12, a scheme in which simultaneous transmission to UL and reception from DL is allowed in a collided SF of an MCC and an SCC having different link directions and all CCs are used in all SFs irrespective of whether SFs are collided SFs and link directions unlike the HD-TDD CA structure may be considered. This scheme is referred to as a full-duplex scheme and full-duplex type TDD-based carrier aggregation is referred to as FD-TDD CA. Even in case of the FD-TDD CA, in case that the MCC is configured as UL SF and the SCC is configured as DL SF in specific collided SF timing, a DL grant PDCCH scheduling SCC DL data in the corresponding collided SF may not be transmitted via the MCC when a cross-CC scheduling relationship from the MCC to the SCC is configured. An example of such an FD-TDD CA structure is illustrated in FIG. 12. In this example, an SCC DL SF corresponding to a shaded portion cannot receive DL scheduling from the MCC during cross-CC scheduling.

Hence, a method of transmitting/receiving a control channel (for example, a DL/UL grant PDCCH or a PHICH) for cross-CC scheduling operation in carrier aggregation of a plurality of CCs having different DL-UL configurations is proposed. Specifically, in case that cross-CC scheduling is configured in carrier aggregation of CCs as described above, a control channel may be transmitted or received via a specific CC (for example, a scheduling CC or an MCC) on an uplink or on a downlink. If the CCs have different DL-UL configurations, collided SF may occur. Whether a DL grant PDCCH scheduling SCC DL data (that is, DL data transmitted via an SCC) will be transmitted via, for example, the MCC or the SCC is decided based on whether collision occurs in a specific SF. In addition, whether a DL grant PDCCH will be transmitted via, for example, an L-PDCCH region or an E-PDCCH region is decided. As mentioned above, a collided SF, which the present invention is concerned about, may mean SF timing which is configured as UL SF in an MCC (and/or a PCC) and as a DL SF in an SCC. Hereinafter, a collided SF means an SF which is configured as UL in an MCC (and/or a PCC) and to a DL in an SCC unless otherwise mentioned. In this example, in case of the HD-TDD CA, only a DL SF of an SCC having a DL direction is used in the collided SF. In this case, an MCC (and/or a PCC) may be configured as "X" SF. On the other hand, in case of the FD-TDD CA, all UL/DL SFs configured in the respective CCs may be used in the collided SF. In case that a cross-CC scheduling mode is configured, however, scheduling information may be transmitted only via an MCC DL SF. According to legacy operation, therefore, a DL grant PDCCH for scheduling of an SCC DL SF cannot be transmitted in a collided SF in which an MCC is an "X" SF or a UL SF.

According to an embodiment of the present invention, a DL grant PDCCH scheduling MCC DL data (that is, DL data transmitted via an MCC) may be transmitted via an L-PDCCH region or an E-PDCCH region (that is, a search space configured on the corresponding region) of the MCC. A DL grant PDCCH (that is, an SCC DL grant PDCCH) scheduling SCC DL data (that is, DL data transmitted via an SCC) may be transmitted via the L-PDCCH region or the E-PDCCH region of the MCC in an SF other than a collided SF. Preferably, DL grant PDCCH is transmitted via the L-PDCCH region. This is because faster detection is possible when transmitted via the L-PDCCH region. In the collided SF, on the other hand, the DL grant PDCCH may be transmitted via an L-PDCCH region or an E-PDCCH region of the SCC. Preferably, DL grant PDCCH is transmitted via the E-PDCCH region of the SCC. This is because performing of cross-CC scheduling based on the L-PDCCH region of the MCC may mean a situation in which the L-PDCCH region of the SCC is not suitable for PDCCH transmission due to interference and channel state (from the viewpoint of the user equipment). In this case, a CIF may be omitted from the SCC DL grant PDCCH transmitted via the SCC. In case that the SCC DL grant PDCCH is transmitted via the MCC, however, the CIF is included.

Figure 13:
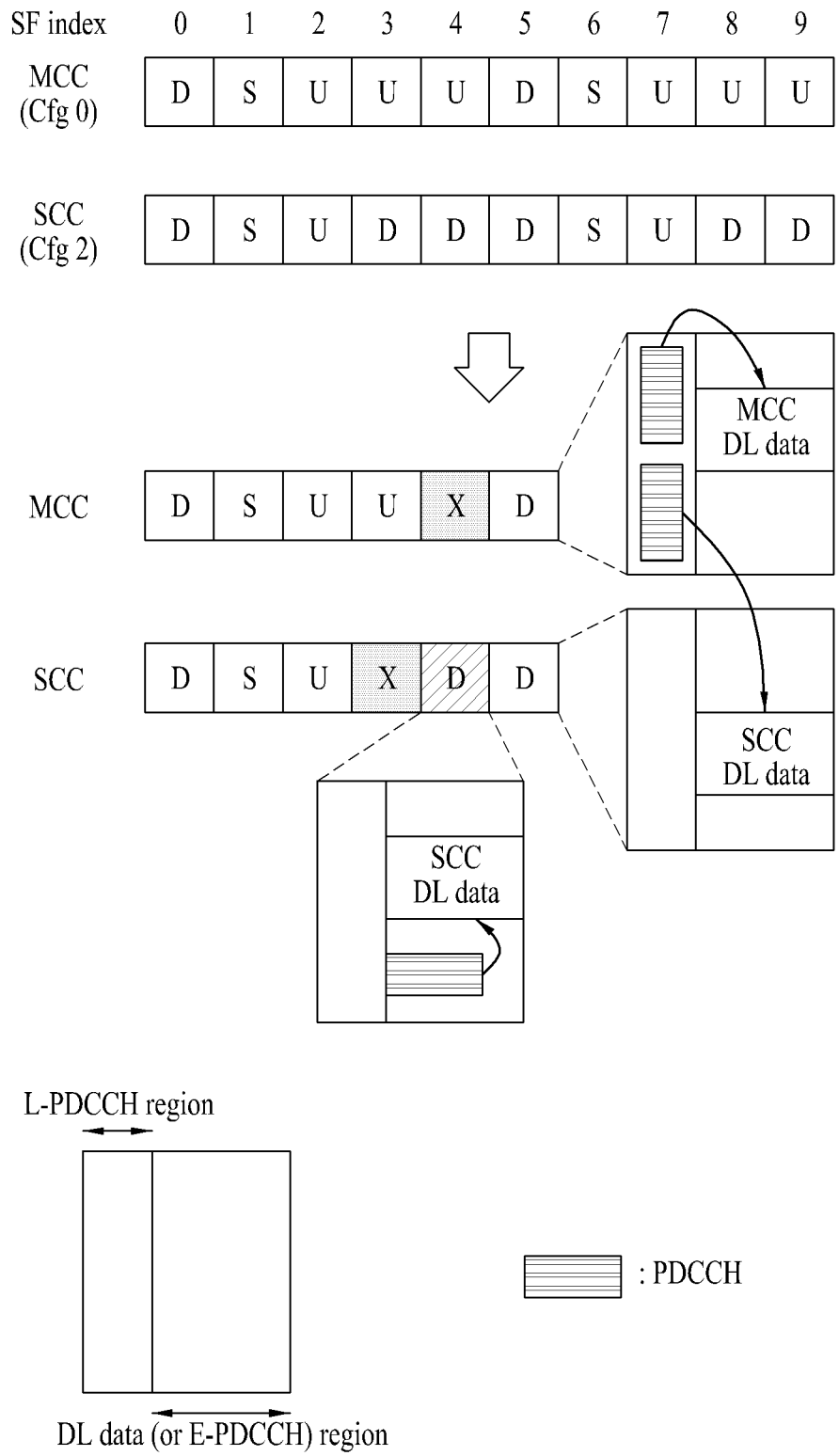
FIGS. 13 and 14 illustrate a method of transmitting a DL grant PDCCH in case that cross-carrier scheduling is configured according to embodiments of the present invention.

FIG. 13 illustrates a method of transmitting a DL grant PDCCH in case that cross-CC scheduling is configured in an HD-TDD CA structure according to an embodiment of the present invention.

Referring to FIG. 13, an MCC is configured as, for example, DL-UL configuration #0 and an SCC is configured as, for example, DL-UL configuration #2. In this example, a collided SF may occur in SF timing in which SF indexes are 3, 4, 8, and 9. In case that cross-CC scheduling is configured, a DL grant PDCCH of the SCC may not be transmitted via an MCC in SF timing in which an SF index is, for example, 4. According to embodiments of the present invention, in case that cross-CC scheduling is configured to be performed via an L-PDCCH region of the MCC, the SCC DL grant PDCCH may be transmitted via the L-PDCCH region of the MCC in SF timing which does not correspond to collided SF and may be transmitted via an L-PDCCH region or an E-PDCCH region of the SCC in collided SF timing. As mentioned above, the SCC DL grant PDCCH is preferably transmitted via the E-PDCCH region of the SCC.

Although the MCC is configured as DL-UL configuration #0 and the SCC is configured as DL-UL configuration #2 in the example of FIG. 13, embodiments of the present invention may also be applied even in case that the MCC and the SCC have different DL-UL configurations. In addition, although cross-CC scheduling is configured to be performed via L-PDCCH region of the MCC by way of example, embodiments of the present invention may also be equally applied even in case that cross-CC scheduling is configured to be performed via the E-PDCCH region of the MCC. In this case, the SCC DL grant PDCCH may be transmitted via E-PDCCH region of the MCC in SF timing which does not correspond to collided SF.

Figure 14:
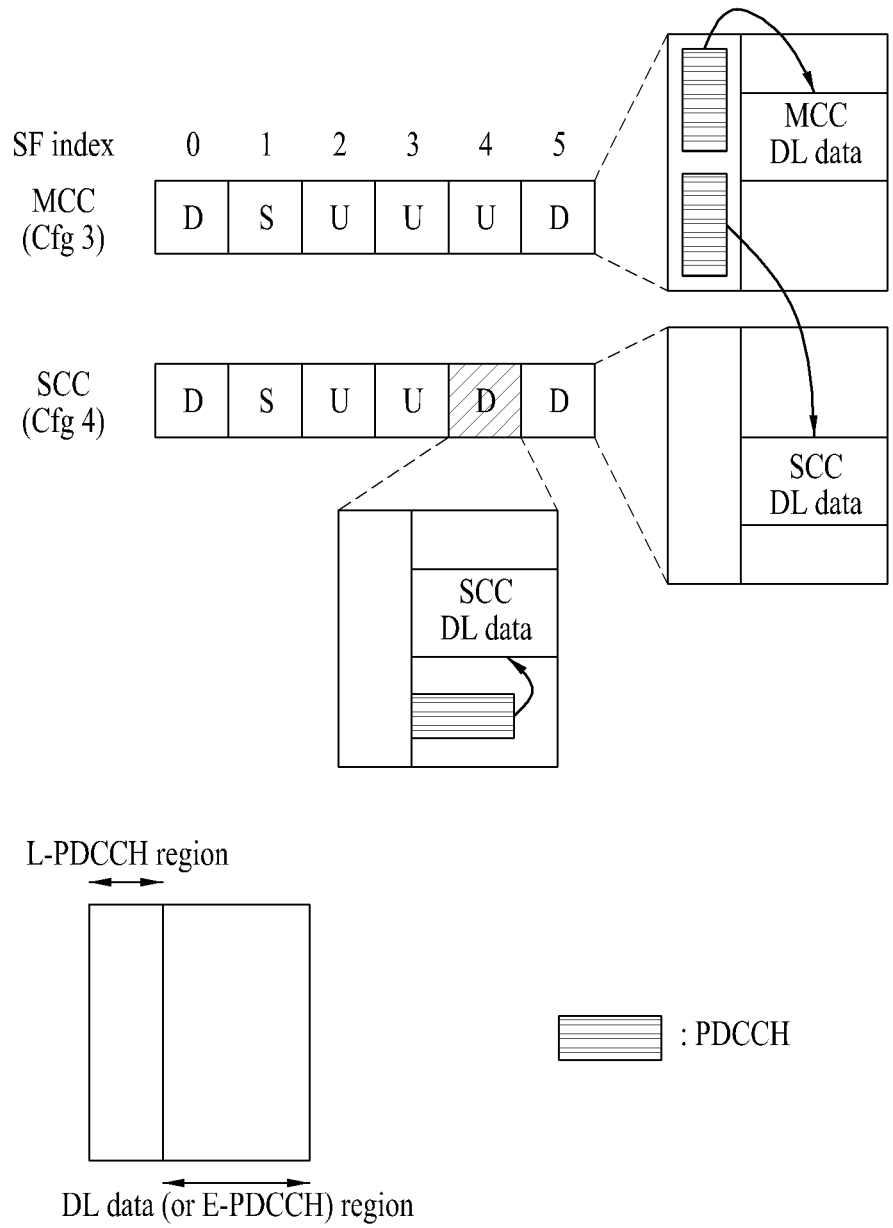

FIG. 14 illustrates a method of transmitting a DL grant PDCCH in case that cross-CC scheduling is configured in an FD-TDD CA structure according to an embodiment of the present invention.

Referring to FIG. 14, an MCC is configured as, for example, DL-UL configuration #3 and an SCC is configured as, for example, DL-UL configuration #4. In this example, in case that cross-CC scheduling is configured, a DL grant PDCCH for the SCC may not be transmitted via an MCC since the MCC is configured to have a UL direction in SF timing (that is a shaded SF) in which an SF index is, for example, 4. According to embodiments of the present invention, in case that cross-CC scheduling is configured to be performed via an L-PDCCH region of the MCC, the SCC DL grant PDCCH may be transmitted via the L-PDCCH region of the MCC in SF timing which does not correspond to the shaded SF and may be transmitted via an L-PDCCH region or an E-PDCCH region of the SCC in case that transmission of the DL grant PDCCH via the MCC is impossible as in the shade SF. As described in FIG. 13, performing of cross-CC scheduling based on the L-PDCCH region of the MCC may mean a situation which the L-PDCCH region of the SCC is not suitable for PDCCH transmission due to interference and channel state (from the viewpoint of the UE). Preferably, therefore, the SCC DL grant PDCCH is transmitted via the E-PDCCH region of the SCC in collided SF timing which corresponds to the shaded SF.

Although the MCC is configured as DL-UL configuration #3 and the SCC is configured as DL-UL configuration #4 in the example of FIG. 14, embodiments of the present invention may also be applied even in case that the MCC and the SCC have DL-UL configurations other than #3 and #4. In addition, although cross-CC scheduling is configured to be performed via L-PDCCH region of the MCC by way of example, embodiments of the present invention may also be equally applied even in case that cross-CC scheduling is configured to be performed via the E-PDCCH region of the MCC. In this case, the SCC DL grant PDCCH may be transmitted via E-PDCCH region of the MCC in SF timing which does not correspond to the shaded SF.

In case of PDSCH (that is, DL data) transmission, a DL grant PDCCH for PDSCH scheduling may be transmitted in the same timing as the PDSCH. On the other hand, a UL grant PDCCH for UL data scheduling may be transmitted in timing different from a PUSCH (that is, UL data). The PUSCH may be transmitted in response to a UL grant PDCCH and/or PHICH (ACK/NACK). For example, when the user equipment receives the UL grant PDCCH and/or PHICH (ACK/NACK) in a TDD mode, the user equipment may transmit a PUSCH after k subframes according to DL-UL configuration. The PHICH corresponds to an ACK/NACK response to previous PUSCH transmission.

Table 7 indicates an Uplink Association Index (UAI) (k) for PUSCH transmission in LTE (or LTE-A). Table 7 indicates intervals between DL subframes and a UL subframe associated therewith from the viewpoint of the DL subframes in which PHICH/UL grants have been detected. Specifically, in case that a PHICH/UL grant is detected in a subframe n, the user equipment may transmit a PUSCH in a subframe n+k.

TABLE 7

| TDD UL/DL Configuration | 0 | 1 | 2 | 3 | 4 | 5 | 6 | 7 | 8 | 9 |
|---|---|---|---|---|---|---|---|---|---|---|
| 0 |   | 4 | 6 |   |   | 4 | 6 |   |   |   |
| 1 |   |   | 6 |   | 4 |   | 6 |   |   | 4 |
| 2 |   |   |   | 4 |   |   |   |   | 4 |   |
| 3 |   | 4 |   |   |   |   |   |   | 4 | 4 |
| 4 |   |   |   |   |   |   |   |   | 4 | 4 |
| 5 |   |   |   |   |   |   |   |   | 4 |   |
| 6 |   | 7 | 7 |   |   | 7 | 7 |   |   | 5 |

In case that cross-CC scheduling is configured in TDD-based carrier aggregation, a UL grant PDCCH/PHICH for SCC UL data (that is, UL data transmitted via the SCC) transmission may be received in timing as described above (or timing defined/configured in a specific TDD DL-UL configuration) and collided SF may occur between the MCC and the SCC in SF timing in which the UL grant PDCCH/PHICH for SCC UL data transmission is transmitted. As described with reference to FIGS. 13 and 14, even in case that SF link directions are collided with each other between the MCC and the SCC and, therefore, the SCC UL grant PDCCH/PHICH cannot be transmitted via the MCC, the SCC UL grant PDCCH may be transmitted via the L-PDCCH region or the E-PDCCH region of the SCC and the SCC PHICH may be transmitted via the PHICH region of the SCC or the PHICH assigned to the data region like the E-PDCCH, i.e. the E-PHICH region, of the SCC. As described with reference to FIGS. 13 and 14, in case that the SCC UL grant PDCCH/PHICH cannot be transmitted via the MCC, the SCC UL grant PDCCH is preferably transmitted via the E-PDCCH region of the SCC. In addition, in case that the SCC UL grant PDCCH is transmitted via the E-PDCCH region of the SCC, a CIF may be omitted from the SCC UL grant PDCCH transmitted via the SCC. In case that the SCC UL grant PDCCH is transmitted via the MCC, however, the CIF is not omitted.

Figure 15:
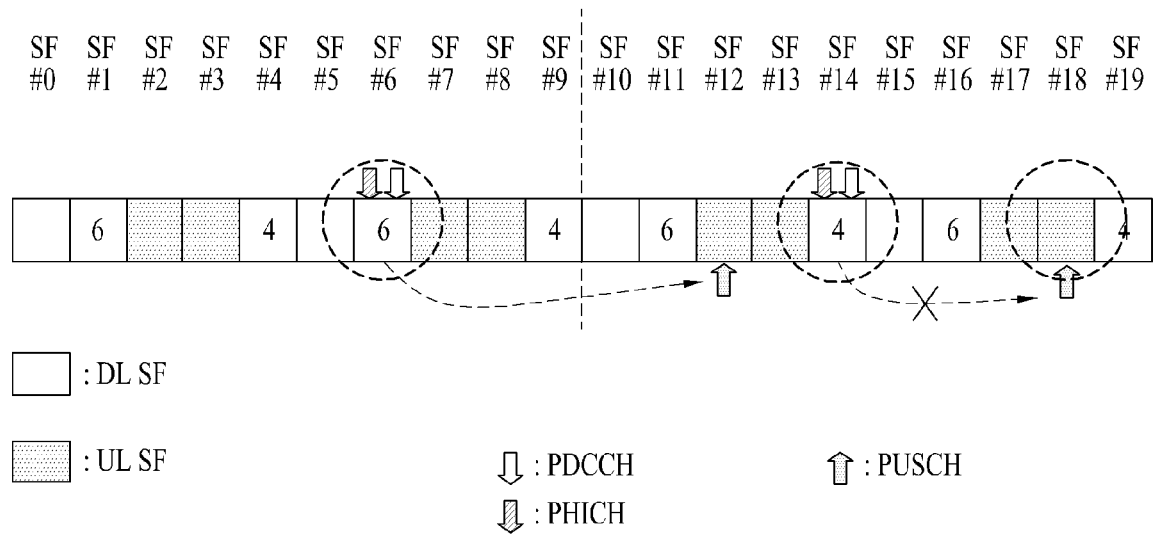
FIG. 15 illustrates UL grant PDCCH/PHICH and PUSCH transmission timing.

FIG. 15 illustrates UL grant PDCCH/PHICH and PUSCH transmission timing in case that DL-UL configuration #1 is configured. In the drawing, SF#0 to SF#9 and SF#10 to SF#19 correspond to a radio frame, respectively. In the drawings, numbers in boxes indicate UL subframes associated with a DL subframe from the viewpoint of the DL subframe. For example, a PUSCH for a PHICH/UL grant of SF#6 is transmitted in SF#6+6 (=SF#12) and a PUSCH for a PHICH/UL grant of SF#14 is transmitted in SF#14+4 (=SF#18).

Referring to FIG. 15, an SCC is shown in FIG. 15, and a case in which an MCC is present for carrier aggregation and cross-CC scheduling is performed via the MCC may be considered. For example, it is assumed that the SCC is a DL SF but the MCC is a UL SF in SF#6 timing and, therefore, SF#6 is a collided SF. According to an embodiment of the present invention, even in this case, a PHICH/UL grant may be transmitted via an L-PDCCH region or an E-PDCCH region of the SCC and, therefore, a PUSCH in response to the PHICH/UL grant may be transmitted in SF#12.

In the same manner, the SCC is a DL SF and the MCC is a UL SF in SF#14 timing and, therefore, they may collide with each other. Even in this case, according to an embodiment of the present invention, a PHICH/UL grant may be transmitted via an L-PDCCH region or an E-PDCCH region of the SCC. However, link directions of the MCC and the SCC collide with each other in SF#18 timing. In case that the UL SF of the SCC becomes an "X" SF, therefore, a PUSCH cannot be transmitted.

Figure 16:
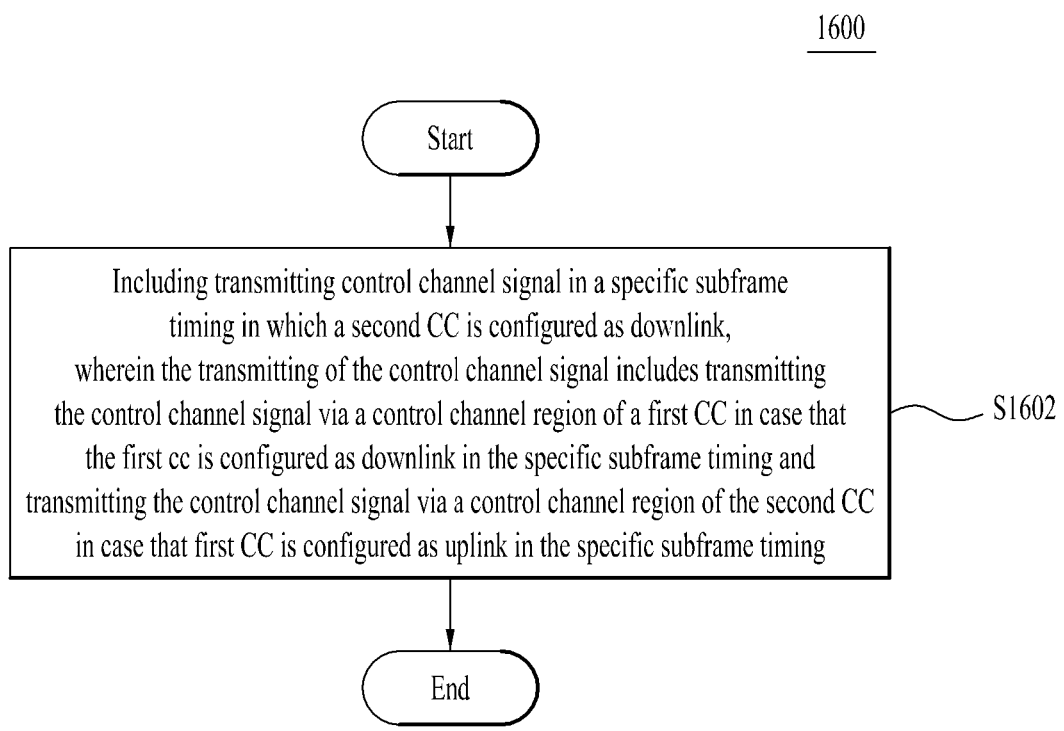
FIG. 16 illustrates a downlink signal transmitting method performed by a base station in which cross-carrier scheduling via a first Component Carrier (CC) is configured in a TDD wireless communication system in which the first CC and a second CC are aggregated according to an embodiment of the present invention.

FIG. 16 is a flowchart illustrating a downlink signal transmitting method 1600 performed by a base station in which cross-carrier scheduling via a first Component Carrier (CC) is configured in a TDD wireless communication system in which the first CC and a second CC are aggregated according to an embodiment of the present invention.

At step S1602, the method 1600 includes transmitting a control channel signal in specific subframe timing in which the second CC is configured as downlink. The step of transmitting the control channel signal may include transmitting the control channel signal via a control channel region of the first CC in case that the first CC is configured as downlink in the specific subframe timing and transmitting the control channel signal via a control channel region of the second CC in case that the first CC is configured as uplink in the specific subframe timing.

Figure 17:
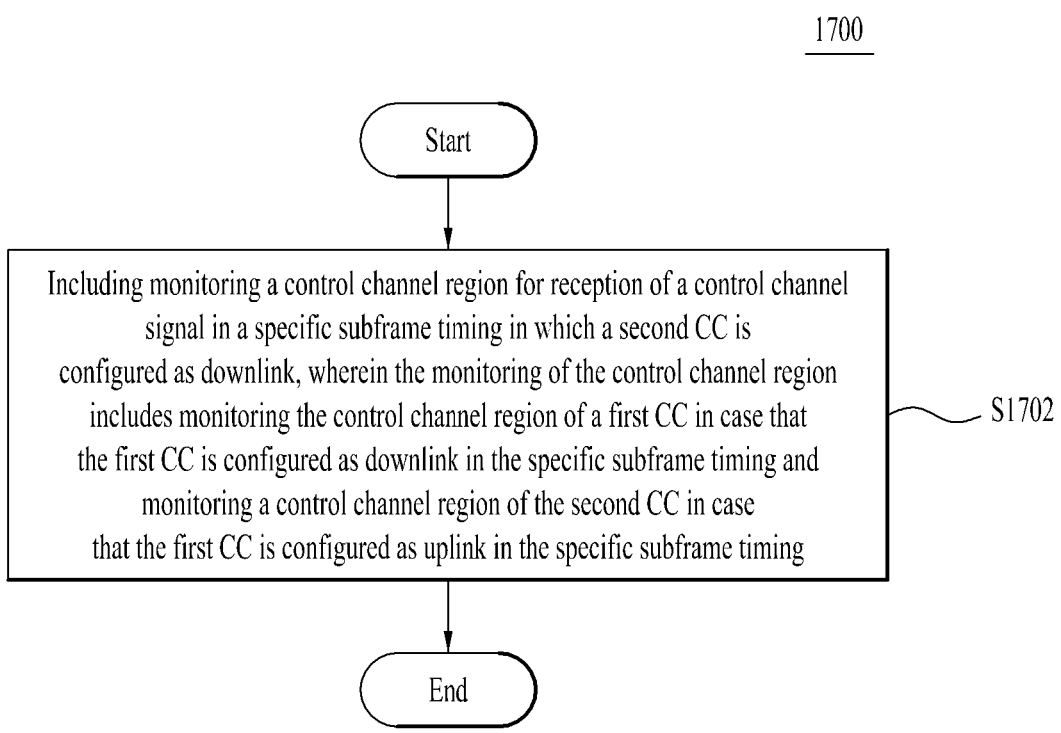
FIG. 17 illustrates a downlink signal receiving method performed by a user equipment in which cross-carrier scheduling via a first CC is configured in a TDD wireless communication system in which the first CC and a second CC are aggregated according to an embodiment of the present invention.

FIG. 17 is a flowchart illustrating a downlink signal receiving method 1700 performed by a user equipment in which cross-carrier scheduling via a first CC is configured in a TDD wireless communication system in which the first CC and a second CC are aggregated according to an embodiment of the present invention.

At step S1702, the method 1700 includes monitoring a control channel region for receiving a control channel signal in specific subframe timing in which the second CC is configured as downlink. The step of monitoring the control channel region may include monitoring a control channel region of the first CC in case that the first CC is configured as downlink in the specific subframe timing and monitoring a control channel region of the second CC in case that the first CC is configured as uplink in the specific subframe timing.

Figure 18:
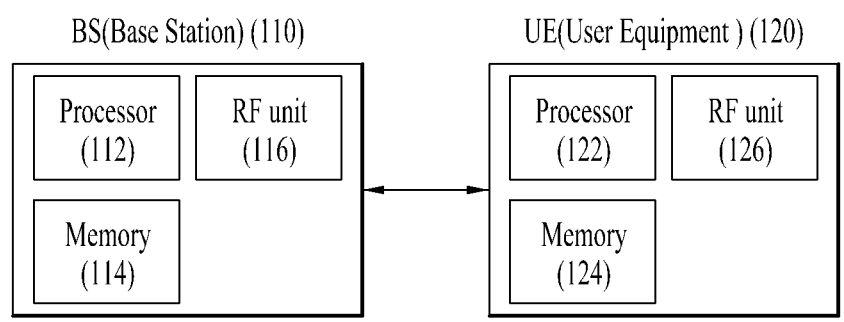
FIG. 18 illustrates a base station and a user equipment applicable to the present invention.

FIG. 18 illustrates a base station, a relay, and a user equipment applicable to the present invention.

Referring to FIG. 18, a wireless communication system includes a base station (BS) 110 and a user equipment (UE) 120. In case that the wireless communication system includes a relay, the base station or the user equipment may be replaced with the relay.

The base station 110 includes a processor 112, a memory 114, and a radio frequency (RF) unit 116. The processor 112 may be configured to perform procedures and/or methods proposed by the present invention. The memory 114 is connected to the processor 112 to store various kinds of information related to operation of the processor 112. The RF unit 116 is connected to the processor 112 to transmit and/or receive a radio signal. The user equipment 120 includes a processor 122, a memory 124, and an RF unit 126. The processor 122 may be configured to perform procedures and/or methods proposed by the present invention. The memory 124 is connected to the processor 122 to store various kinds of information related to operation of the processor 122. The RF unit 126 is connected to the processor 122 to transmit and/or receive a radio signal.

The embodiments of the disclosure described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, the description mainly focused on a signal transmission and reception relationship between a relay and a base station. Such a signal transmission and reception relationship may be identically or similarly applied to signal transmission and reception between a user equipment and a base station and between a user equipment and a relay. In this disclosure, a specific operation described as being performed by the base station may be performed by an upper node of the base station according to circumstances. That is, it is apparent that, in a network comprised of a plurality of network nodes including a base station, various operations performed for communication with a user equipment may be performed by the base station or network nodes other than the base station. The term 'base station' may be replaced with a fixed station, a Node B, an evolved Node B (eNode B or eNB), an access point, etc. In addition, the term 'user equipment' may be replaced with a mobile station (MS), a mobile subscriber station (MSS), etc.

Embodiments of the present invention may be achieved by various means, for example, hardware, firmware, software, or a combination thereof. In a hardware configuration, an embodiment of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. performing the above-described functions or operations. Software code may be stored in a memory unit and performed by a processor. The memory unit may be located at the interior or exterior of the processor and may transmit and receive data to and from the processor via various known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The present invention may be used in a wireless communication apparatus, such as a user equipment, a relay, or a base station.

The invention claimed is:

1. A downlink signal transmitting method performed by a base station for which cross-carrier scheduling via a first component carrier (CC) is configured in a time division duplex (TDD) wireless communication system in which the first CC and a second CC are aggregated, the method comprising:
transmitting a control channel signal in a specific subframe timing in which the second CC is configured as downlink,
wherein the transmitting of the control channel signal comprises transmitting the control channel signal via a control channel region of the first CC when the first CC is configured as downlink in the specific subframe timing, and
wherein the transmitting of the control channel signal via a control channel region of the second CC when the first CC is configured as uplink in the specific subframe timing.

2. The method according to claim 1, wherein the control channel signal is an uplink grant Physical Downlink Control Channel (PDCCH) signal or a downlink grant PDCCH signal for the second CC.

3. The method according to claim 2, wherein the PDCCH signal includes a Carrier Indicator Field (CIF) when the first CC is configured as downlink in the specific subframe timing, and the PDCCH signal is transmitted without a CIF when the first CC is configured as uplink in the specific subframe timing.

4. The method according to claim 1, wherein the control channel region of the second CC is an Enhanced PDCCH (E-PDCCH) region of the second CC, and the E-PDCCH region indicates a PDCCH region assigned to a data region of a subframe.

5. The method according to claim 1, wherein the control channel signal is a Physical Hybrid ARQ Indicator Channel (PHICH) signal for the second CC.

6. A method for receiving a downlink signal by a user equipment for which cross-carrier scheduling via a first component carrier (CC) is configured in a TDD wireless communication system in which the first CC and a second CC are aggregated, the method comprising:
monitoring a control channel region for receiving a control channel signal in specific subframe timing in which the second CC is configured as downlink,
wherein the monitoring of the control channel region comprises monitoring a control channel region of the first CC when the first CC is configured as downlink in the specific subframe timing and monitoring a control channel region of the second CC when the first CC is configured as uplink in the specific subframe timing.

7. The method according to claim 6, wherein the control channel signal is an uplink grant PDCCH signal or a downlink grant PDCCH signal for the second CC.

8. The method according to claim 6, wherein the control channel region of the second CC is an E-PDCCH region of the second CC and the E-PDCCH region indicates a PDCCH region assigned to a data region of a subframe.

9. The method according to claim 6, wherein the control channel signal is a PHICH signal for the second CC.

10. A base station for which cross-carrier scheduling via a first component carrier (CC) is configured in a TDD wireless communication system in which the first CC and a second CC are aggregated, the base station comprising:
a Radio Frequency (RF) unit; and
a processor, wherein the processor is configured to transmit a control channel signal in specific subframe timing in which the second CC is configured as downlink, and
wherein the transmitting of the control channel signal comprises transmitting the control channel signal via a control channel region of the first CC when the first CC is configured as downlink in the specific subframe timing and transmitting the control channel signal via a control channel region of the second CC when the first CC is configured as uplink in the specific subframe timing.

11. The base station according to claim 10, wherein the control channel signal is an uplink grant PDCCH signal or a downlink grant PDCCH signal for the second CC.

12. The base station according to claim 11, wherein the PDCCH signal comprises a CIF when the first CC is configured as downlink in the specific subframe timing and the PDCCH signal is transmitted without a CIF when the first CC is configured as uplink in the specific subframe timing.

13. The base station according to claim 10, wherein the control channel region of the second CC is an E-PDCCH region of the second CC and the E-PDCCH region indicates a PDCCH region assigned to a data region of a subframe.

14. The base station according to claim 10, wherein the control channel signal is a PHICH signal for the second CC.

15. A user equipment for which cross-carrier scheduling via a first component carrier (CC) is configured in a TDD wireless communication system in which the first CC and a second CC are aggregated, the user equipment comprising:
an RF unit; and
a processor, wherein the processor is configured to monitor a control channel region for receiving a control channel signal in a specific subframe timing in which the second CC is configured as downlink, and
wherein the monitoring of the control channel region comprises monitoring a control channel region of the first CC when the first CC is configured as downlink in the specific subframe timing and monitoring a control channel region of the second CC when the first CC is configured as uplink in the specific subframe timing.

16. The user equipment according to claim 15, wherein the control channel signal is an uplink grant PDCCH signal or a downlink grant PDCCH signal for the second CC.

17. The user equipment according to claim 15, wherein the control channel region of the second CC is an E-PDCCH region of the second CC and the E-PDCCH region indicates a PDCCH region assigned to a data region of a subframe.

18. The user equipment according to claim 17, wherein the control channel signal is a PHICH signal for the second CC.

* * * * *